US012009862B2

(12) United States Patent
Ito et al.

(10) Patent No.: US 12,009,862 B2
(45) Date of Patent: Jun. 11, 2024

(54) WIRELESS TRANSMITTING SYSTEM, WIRELESS RECEIVING SYSTEM, BASE STATION APPARATUS, WIRELESS COMMUNICATION SYSTEM, WIRELESS TRANSMITTING METHOD, AND WIRELESS RECEIVING METHOD

(71) Applicant: NIPPON TELEGRAPH AND TELEPHONE CORPORATION, Tokyo (JP)

(72) Inventors: Kota Ito, Musashino (JP); Mizuki Suga, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 85 days.

(21) Appl. No.: 17/775,745

(22) PCT Filed: Nov. 25, 2019

(86) PCT No.: PCT/JP2019/046001
§ 371 (c)(1),
(2) Date: May 10, 2022

(87) PCT Pub. No.: WO2021/106043
PCT Pub. Date: Jun. 3, 2021

(65) Prior Publication Data
US 2022/0393764 A1    Dec. 8, 2022

(51) Int. Cl.
*H04B 10/2575*     (2013.01)
(52) U.S. Cl.
CPC ............................ *H04B 10/25753* (2013.01)

(58) Field of Classification Search
CPC ................. H01Q 3/2676; H01Q 21/08; H04B 10/25753; H04B 10/25759; H04B 10/506
(Continued)

(56) References Cited

U.S. PATENT DOCUMENTS

| 4,506,265 A | * | 3/1985 | Dumas | ................. H01Q 19/134 |
|---|---|---|---|---|
| | | | | 343/840 |
| 5,955,992 A | * | 9/1999 | Shattil | ..................... H04B 7/12 |
| | | | | 342/372 |

(Continued)

FOREIGN PATENT DOCUMENTS

| EP | 3937397 A1 | * | 1/2022 | ............ H01Q 1/288 |
|---|---|---|---|---|
| JP | H10145286 A | | 5/1998 | |

(Continued)

OTHER PUBLICATIONS

Dennis T. K. Tong and Ming C. Wu, A Novel Multiwavelength Optically Controlled Phased Array Antenna with a Programmable Dispersion Matrix, IEEE Photonics Technology Letters, vol. 8, No. 6, 1996, pp. 812-814.

(Continued)

*Primary Examiner* — Abbas H Alagheband
(74) *Attorney, Agent, or Firm* — Harness, Dickey & Pierce, P.L.C.

(57) ABSTRACT

An accommodation station transmission unit modulates light to generate an optical signal based on an RF signal and outputs the generated optical signal, a base station transmission unit obtains the optical signal from an input port, demultiplexes the obtained optical signal for each wavelength, outputs the demultiplexed optical signals from output ports of corresponding wavelengths from among a plurality of output ports allocated to each of the wavelengths of the light, and demodulates the RF signal by converting the optical signals output by the output ports into electrical signals, a plurality of transmission antennas emit the (Continued)

demodulated RF signal, and a reflect array or a transmit array receives the RF signal emitted by each of the transmission antennas and forms a transmission beam in a different direction for each position of the transmission antenna that is a transmission source of the RF signal for each RF signal.

4 Claims, 27 Drawing Sheets

(58) Field of Classification Search
USPC .......................................................... 398/115
See application file for complete search history.

(56) References Cited

U.S. PATENT DOCUMENTS

| | | | | |
|---|---|---|---|---|
| 2002/0048071 A1* | 4/2002 | Suzuki | ............. | H04B 10/25755 |
| | | | | 398/141 |
| 2002/0080448 A1* | 6/2002 | Kim | ................ | H04B 10/25753 |
| | | | | 398/115 |
| 2002/0197986 A1* | 12/2002 | Goss | .................. | H04W 88/085 |
| | | | | 455/448 |
| 2006/0079290 A1* | 4/2006 | Seto | ...................... | H04B 7/086 |
| | | | | 455/562.1 |
| 2016/0054431 A1* | 2/2016 | Zou | ...................... | H01Q 3/2676 |
| | | | | 342/372 |
| 2016/0344461 A1* | 11/2016 | Frank | .................. | H04B 7/0413 |
| 2017/0063461 A1* | 3/2017 | Prucnal | .................... | H04Q 1/00 |
| 2017/0207531 A1* | 7/2017 | Murakowski | .......... | H01Q 21/22 |
| 2018/0203095 A1* | 7/2018 | Xie | ......... | G01S 7/023 |
| 2019/0319356 A1* | 10/2019 | Shi | ......... | H01Q 21/22 |

FOREIGN PATENT DOCUMENTS

| | | | | | |
|---|---|---|---|---|---|
| JP | | 3816672 | B2 * | 6/1998 | |
| JP | | 200867048 | A | 3/2008 | |
| JP | | 4246724 | B2 | 4/2009 | |
| WO | WO-2014091221 | A1 * | 6/2014 | ......... | H01Q 21/0006 |

OTHER PUBLICATIONS

Qi Luo et al., Low-cost Smart Antennas, John Wiley & Sons, Ltd., Mar. 18, 2019.

Kyo Minoguchi et al., Beam Steering of 60 GHz-Band Array-Antenna Utilizing Radio-over-Fiber Transmission Technique and Effect of Chromatic Dispersion, IEICE Transactions C, vol. J99-C, No. 9, 2016, pp. 425-433.

Tomihiro Ikegami et al., Design of Multi-layer Transmit-phased-array with Varactor Diodes Using Matrix Calculation for Two-dimensional Beam-scanning, IEICE Technical Report, vol. 118, No. 310, 2018, pp. 161-166.

* cited by examiner

WIRELESS TRANSMITTING SYSTEM, WIRELESS RECEIVING SYSTEM, BASE STATION APPARATUS, WIRELESS COMMUNICATION SYSTEM, WIRELESS TRANSMITTING METHOD, AND WIRELESS RECEIVING METHOD

CROSS-REFERENCE TO RELATED APPLICATIONS

This application is a 371 U.S. National Phase of International Application No. PCT/JP2019/046001, filed on Nov. 25, 2019. The entire disclosure of the above application is incorporated herein by reference.

TECHNICAL FIELD

The present invention relates to a wireless transmission system, a wireless reception system, a base station apparatus, a wireless communication system, a wireless transmission method, and a wireless reception method using radio over fibers (RoFs).

BACKGROUND ART

In wireless communication services, millimeter wave bands have been attracting attention as frequency bands that enable high-speed transmission. However, there is a problem that long-distance transmission is difficult due to a large propagation loss in the millimeter wave bands. As one of solutions to this problem, an RoF system is known. In an RoF system, an accommodation station apparatus (master station) performs intensity modulation on an optical carrier with a radio frequency (RF) signal to be transmitted, generates an optically modulated signal, and transmits the generated optically modulated signal through an optical fiber. A base station apparatus (slave station) demodulates the optically modulated signal received via the optical fiber into an RF signal and emits the demodulated RF signal as a radio wave from an antenna. It is possible to achieve long-distance transmission of a millimeter wave band RF signal using such an RoF system.

Even though long-distance transmission can be achieved through the application of an RoF system to the millimeter wave band, enlargement of a coverage area of the base station apparatus is problematic. One of solutions to this problem is beamforming using array antennas. In beamforming using array antennas, a phase of an RF signal that is incident on each antenna element of the array antennas is controlled to cause radio waves emitted from the antenna elements to interfere with each other. In this manner, an emission direction of the radio waves is controlled as a whole.

For example, there is a phenomenon that a delay difference occurs between optical signals of different wavelengths due to wavelength dispersion during transmission through an optical fiber. For beamforming in an RoF system, a technique of controlling phases of RF signals to be sent to antenna elements by controlling a wavelength of an optical carrier using this phenomenon is known (see PTL 1, for example).

FIG. 23 is a block diagram of an RoF system to which the technique disclosed in PTL 1 is applied. A multiple-wavelength variable light source 101 of an accommodation station apparatus 100 outputs a plurality of optical signals. Wavelength intervals among the plurality of optical signals can be arbitrarily changed. An optical modulator 102 modulates an optical signal of each wavelength with an RF signal to be transmitted. The optical modulator 102 generates and outputs optically modulated signals of different wavelengths. An optical fiber 300 transmits the optically modulated signals of different wavelengths.

When the optical fiber 300 transmits the optically modulated signals of different wavelengths, a delay difference that is different for each wavelength occurs in each optically modulated signal due to an influence of wavelength dispersion. The plurality of optically modulated signals transmitted through the optical fiber 300 is branched, for each wavelength, by an optical demultiplexer 201 of a base station apparatus 200. Each of a plurality of optical/electrical (O/E) converters 202-1 to 202-$n$ converts the branched optically modulated signal of each wavelength into an electrical signal and demodulates the RF signal. Antenna elements 203-1 to 203-$n$ emit the demodulated RF signals as radio waves. At this time, phase differences occur in the RF signals as well due to the delay difference due to the wavelength dispersion caused during the transmission through the optical fiber 300. Thus, directivity is formed in the emitted radio waves of the RF signals.

This is not limited to the RoF system, and there are methods of performing beamforming of array antennas using optical signals applicable to arbitrary wireless communication systems. As one of the methods, a technique of, without controlling a wavelength, assigning a fixed wavelength to each antenna element and causing a delay difference in optical signals of different wavelengths using wavelength dispersion and a path difference is known (see NPL 1, for example).

FIG. 24 is a block diagram illustrating a wireless system to which the technique described in NPL 1 is applied. A multiple-wavelength variable light source 401 outputs a plurality of optical signals, each of which has a different wavelength. An optical modulator 402 modulates the optical signal of each wavelength with an RF signal to be transmitted and generates a plurality of optically modulated signals. The optical modulator 402 outputs, to a programmable dispersion matrix (PDM) 403, the plurality of optically modulated signals generated. The PDM 403 receives the plurality of optically modulated signals.

FIG. 25 is a block diagram illustrating an internal configuration of the PDM 403. The PDM 403 includes n+1 2×2 optical switches 411-1 to 411-($n$+1) and n dispersion element units 412-1 to 412-$n$. Dispersion values that the n dispersion element units 412-1 to 412-$n$ apply to input signals are D0, 2D0, ..., $2^{n-1}$D0, respectively. For example, dispersion fibers, grating fibers, or the like can be applied for the dispersion element units 412-1 to 412-$n$. The PDM 403 adjusts the dispersion values as a whole through switching of the 2×2 optical switches 411-1 to 411-($n$+1). In this manner, delay differences that differ in accordance with the dispersion values adjusted by the PDM 403 occur in the optically modulated signals that the PDM 403 has received.

Returning to FIG. 24, the plurality of optically modulated signals output by the PDM 403 are branched for each wavelength by the optical demultiplexer 404 of the wireless system. A plurality of output ports that the optical demultiplexer 404 includes are assigned to each wavelength in a fixed manner. In this manner, each of the antenna elements 406-1 to 406-$n$ is correlated with each wavelength in advance.

Once the optical demultiplexer 404 demultiplexes the optically modulated signals, each of the optically modulated signals demultiplexed is branched and output to an output port corresponding to each wavelength. Each of the plurality of O/E converters 405-1 to 405-*n* converts, into electrical signals, the optically modulated signals of each wavelength that have been branched by the optical demultiplexer 404 and output to each of the plurality of O/E converters 405-1 to 405-*n* and demodulates RF signals. The antenna elements 406-1 to 406-*n* emit the demodulated RF signals as radio waves. The RF signals also have phase differences due to the delay difference caused by dispersion given by the PDM 404. Thus, directivity is formed in the emitted radio waves of the RF signals.

Further, a phase shifter or the like is typically used in a case in which electrical phase adjustment is performed on an RF signal to perform beamforming, and as another beamforming method, methods using a reflect array and a transmit array are known (see NPL 2, for example).

FIG. 26 is a diagram illustrating a beamforming method using a reflect array 500. In order to emit radio waves of RF signals toward the reflect array 500, n feeds 501-1 to 501-*n* are included. Once one certain feed, for example, a feed 501-*i* emits radio waves of the RF signals, the phases of the radio waves of the RF signals are adjusted such that in-phases are strengthened each other in a specific direction when the radio waves are reflected by the reflect array 500. In this manner, one transmission beam corresponding to the feed 501-*i* is formed.

The directions in which the RF signals reflected by the reflect array 500 are strengthened each other in phase is different for each feed. For this reason, transmission beams are formed in different directions when the radio wave of the RF signal is emitted from the feed 501-*i* and when the radio wave of the RF signal is emitted from a feed 501-*j* (i≠j).

Further, the reflect array 500 has reversibility. It is assumed that a radio wave of an RF signal is emitted from the feed 501-*i* and a transmission beam corresponding to the feed 501-*i* is formed. At this time, when an RF signal having the same frequency as that of the transmission beam arrives from a traveling direction of the transmission beam corresponding to the feed 501-*i*, the RF signal is reflected by the reflect array 500 and converges at the position of the feed 501-*i*. Thus, if n reception antennas are provided instead of the feeds 501-1 to 501-*n*, the RF signals received by the reception antennas are signals obtained by performing in-phase synthesis on the arriving RF signals, and selecting an RF signal received by the reception antennas means forming a reception beam.

Moreover, a plurality of beams can be formed using the reflect array 500. Transmission beams can be formed in a plurality of directions by outputting RF signals from each of the plurality of feeds 501-1 to 501-*n*. A plurality of reception beams can be formed using the reflect array 500. By selecting the RF signals received by the n reception antennas provided in place of the plurality of feeds 501-1 to 501-*n*, a plurality of reception beams, each in a different direction, are formed.

In contrast to the aforementioned reflect array, there is also a transmit array. FIG. 27 is a diagram illustrating a beamforming method using a transmit array 600. In order to emit radio waves of RF signals toward the transmit array 600, n feeds 501-1 to 501-*n* are provided. Once one certain feed, for example, a feed 501-*i* emits radio waves of the RF signals, the phases of the radio waves of the RF signals are adjusted such that in-phases are strengthened each other in a specific direction when the radio waves passes through the transmit array 600. In this manner, one transmission beam corresponding to the feed 501-*i* is formed.

The directions in which the RF signals passing through the transmit array 600 are strengthened each other in phase is different for each feed. For this reason, transmission beams are formed in different directions when the radio wave of the RF signal is emitted from the feed 501-*i* and when the radio wave of the RF signal is emitted from a feed 501-*j* (i≠j).

Further, the transmit array 600 has reversibility. It is assumed that a radio wave of an RF signal is emitted from the feed 501-*i* and a transmission beam corresponding to the feed 501-*i* is formed. At this time, when an RF signal having the same frequency as that of the transmission beam arrives from a traveling direction of the transmission beam corresponding to the feed 501-*i*, the RF signal passes through the transmit array 600 and converges at the position of the feed 501-*i*. Thus, if n reception antennas are provided instead of the feeds 501-1 to 501-*n*, the RF signals received by the reception antennas are signals obtained by performing om-phase synthesis on the arriving RF signals, and selecting an RF signal received by the reception antennas means forming of a reception beam.

Moreover, a plurality of beams can be formed using the transmit array 600. Transmission beams can be formed in a plurality of directions by outputting RF signals from each of the plurality of feeds 501-1 to 501-*n*. A plurality of reception beams can be formed using the transmit array 600. By selecting the RF signals received by the n reception antennas provided instead of the plurality of feeds 501-1 to 501-*n*, a plurality of reception beams, each in a different direction, are formed.

CITATION LIST

Patent Literature

PTL1: JP 4246724 B

Non Patent Literature

NPL 1: Dennis T. K. Tong, Ming C. Wu, "A novel Multi-wavelength Optically Controlled Phased Array Antenna with a Programmable Dispersion Matrix", IEEE Photonics Technology Letters, June 1996, Vol. 8, No. 6, p. 812 to 814

NPL 2: Luo, Q., Gao, S. S., Liu, W., & Gu, C. "Low-cost Smart Antennas", Wiley, (2019), p. 165 to 198

SUMMARY OF THE INVENTION

Technical Problem

As described above, the technique disclosed in PTL1 makes wavelengths variable and causes a delay difference in a modulated optical signal in a state in which dispersion is fixed. At this time, it is necessary to significantly adjust wavelength intervals among optically modulated signals depending on a direction that forms directivity, an optical fiber length, and a frequency of an RF signal. For this reason, a wavelength band to be used becomes wide, which may reduce the wavelength utilization efficiency.

For example, in wavelength division multiplex (WDM)-passive optical network (PON), there is a circumstance that it is necessary to use a different wavelength for each base station. If the technique disclosed in PTL 1 is applied to the WDM-PON under such circumstance, it is necessary to secure a wavelength band for beamforming for the WDM-PON in advance, and the wavelength band to be used significantly extends.

Further, according to the technique disclosed in PTL 1, the wavelength is adjusted to form directivity. Accordingly, it is necessary to adjust wavelengths of optical signals to be output to the antenna elements 203-1 to 203-$n$ of the base station apparatus 200 as well. It is thus necessary to change the wavelengths of the optical signals to be output to the antenna elements 203-1 to 203-$n$ of the base station apparatus 200 every time directivity is formed in the optical demultiplexer 201 of the base station apparatus 200.

When the directivity is dynamically changed, it is also necessary to dynamically change the branching by the optical demultiplexer 201 as well. To do so, it is necessary to control the optical demultiplexer 201 of the base station apparatus 200. One of the advantages of applying the RoF system is that it is possible to simplify the base station apparatus 200 by concentrating functions on the accommodation station apparatus 100 in addition to long-distance transmission of RF signals. However, in the case in which the technique of PTL 1 is used, it is necessary to control the optical demultiplexer 201 of the base station apparatus 200, and simplification of the base station apparatus 200 is thus limited.

Moreover, the technique disclosed in PTL 1 requires information regarding the distance of the optical fiber for wavelength adjustment for adjusting a delay difference among the optically modulated signals. In general, the distance of the optical fiber from the accommodation station apparatus 100 to the base station apparatus 200 is not known, or even if the distance is known, an exact length is not known in many cases. It is very difficult to measure the fiber length particularly when the optical fiber is in a passive optical network (PON) configuration. According to PTL 1, because information regarding the exact distance of the optical fiber is needed, the application range is considered to be very limited.

On the other hand, the technique described in NPL 1 makes dispersion variable while keeping wavelengths fixed to cause a delay difference in a modulated optical signal. Because the wavelengths are fixed in the technique of NPL 1, the wavelength utilization efficiency is higher than that of PTL 1. It is also unnecessary to control the optical demultiplexer because the optical splitting is fixed. However, it is considerable that high accuracy is required for the design and production of a PDM for adjusting the dispersion. Thus, the technique in NPL 1 has a problem that the size and cost of the device may increase.

NPL 1 does not mention application to an RoF. In a case in which an RoF is applied to the technique described in NPL 1 to perform long-distance optical fiber transmission, there is a problem that influences of wavelength dispersion during optical fiber transmission have to be considered in addition to the dispersion adjustment performed by the PDM. Further, both PTL 1 and NPL 1 mention only beamforming for transmission antennas and do not mention beamforming for reception antennas. Furthermore, NPL 2 does not mention application to an RoF.

In view of the aforementioned circumstances, an object of the present invention is to provide a technique capable of performing beamforming for transmission/reception antennas without using control of a base station apparatus and information regarding the distance of an optical fiber while curbing degradation of wavelength utilization efficiency and an increase in cost in a wireless communication system using an RoF.

Means for Solving the Problem

According to an aspect of the present invention, a wireless transmission system includes: an accommodation station transmission unit configured to modulate light based on an RF signal to generate optical signal and output the generated optical signal; and a base station transmission unit configured to receive the optical signal output by the accommodation station transmission unit. The base station transmission unit includes: an optical demultiplexer including a plurality of output ports each assigned to a wavelength of the light, the optical demultiplexer being configured to receive, from an input port, the optical signal output by the accommodation station transmission unit, demultiplex the received optical signal for each wavelength, and output the demultiplexed optical signal from the output port corresponding to the wavelength, a plurality of photoelectric converters connected to the plurality of output ports of the optical demultiplexer, the plurality of photoelectric converters being configured to convert the optical signal output by the optical demultiplexer into an electrical signal to demodulate the RF signal and output the demodulated RF signal, a plurality of transmission antennas connected to the plurality of photoelectric converters and configured to emit the RF signal output by each of the photoelectric converters, and a transmission beam formation unit including a reflect array or a transmit array, the reflect array or the transmit array being configured to receive a plurality of RF signal emitted by each of the plurality of transmission antennas and form, for each of the plurality of received RF signals, a plurality of transmission beams in different directions depending on positions of the plurality of transmission antennas that are a transmission source of the RF signal.

According to an aspect of the present invention, a wireless reception system, includes a base station reception unit; and an accommodation station reception unit. The base station reception unit includes: a reception beam formation unit including a reflect array or a transmit array, the reflect array or the transmit array being configured to receive a plurality of arriving RF signals and converge the plurality of RF signals at a plurality of convergence positions that differ depending on arriving directions of the plurality of received RF signals to form reception beams; a plurality of reception antennas disposed at each of the plurality of convergence positions and configured to receive the plurality of RF signals that have converged at the plurality of convergence positions; a plurality of optical modulators connected to the plurality of reception antennas, the plurality of optical modulators being configured to each obtain light of a different wavelength and modulate the obtained light to generate a plurality of optical signals based on the plurality of RF signals received by the plurality of connected reception antennas, and an optical multiplexer configured to multiplex the plurality of optical signals of different wavelengths generated by the plurality of optical modulators and output the plurality of multiplexed optical signals; and the accommodation station reception unit is configured to obtain the plurality of optical signals output by the base station reception unit, and includes: an optical demultiplexer configured to obtain the plurality of optical signals output by the optical multiplexer of the base station reception unit and demultiplex the plurality of optical signals for each wavelength, and an output unit configured to convert the plurality of optical signals demultiplexed by the optical demultiplexer into a plurality of electrical signals to demodulate the plurality of RF signals and output the plurality of demodulated RF signals.

According to an aspect of the present invention, a base station apparatus includes: the aforementioned base station transmission unit; and the aforementioned base station reception unit.

According to an aspect of the present invention, a wireless communication system includes: the aforementioned wireless transmission system; and the aforementioned wireless reception system.

According to an aspect of the present invention, a wireless transmission method performed by a wireless transmission system including an accommodation station transmission unit and a base station transmission unit, the method including: by the accommodation station transmission unit, modulating light based on an RF signal to generate a plurality of optical signals and outputting the generated optical signals; by an optical demultiplexer of the base station transmission unit, obtaining, from an input port, the plurality of optical signals output by the accommodation station transmission unit, demultiplexing the plurality of obtained optical signals depending on wavelengths, and outputting the plurality of demultiplexed optical signals from a plurality of output ports corresponding to the wavelengths from among the plurality of output ports assigned to each of the wavelengths of the light; by a plurality of photoelectric converters of the base station transmission unit, each of the plurality of photoelectric converters being connected to the plurality of output ports of the optical demultiplexer, converting the plurality of optical signals output by the optical demultiplexer into electrical signals to demodulate the RF signal and outputting the demodulated RF signal; by a plurality of transmission antennas of the base station transmission unit, emitting the RF signal output by each of the photoelectric converters; and by a transmission beam formation unit of the base station transmission unit, the transmission beam formation unit including a reflect array or a transmit array, receiving the RF signal emitted by each of the plurality of transmission antennas and forming a plurality of transmission beams, for each of the plurality of RF signals, in different directions for positions of the plurality of transmission antennas that are transmission sources of the plurality of RF signals.

According to an aspect of the present invention, a wireless reception method performed by a wireless reception system including a base station reception unit and an accommodation station reception unit, includes: by a reception beam formation unit of the base station reception unit, the reception beam formation unit including a reflect array or a transmit array, receiving a plurality of arriving RF signals and converging the plurality of RF signals at different convergence positions depending on arriving directions of the plurality of received RF signals to form a plurality of reception beams; by a plurality of reception antennas of the base station reception unit, receiving the plurality of RF signals that has converged at the plurality of convergence positions; by a plurality of optical modulators of the base station reception unit, modulating obtained light of different wavelengths to generate a plurality of optical signals based on the plurality of RF signals received by the plurality of reception antennas each of which is connected to each of the plurality of optical modulators; by an optical multiplexer of the base station reception unit, multiplexing the plurality of optical signals of different wavelengths generated by the plurality of the optical modulators and outputting the plurality of multiplexed optical signals; by an optical demultiplexer of the accommodation station reception unit, receiving the plurality of optical signals output by the optical multiplexer and demultiplexing the plurality of optical signals depending on wavelengths; and by an output unit of the accommodation station reception unit, demodulating the plurality of RF signals by converting the plurality of optical signals demultiplexed by the optical demultiplexer into electrical signals and outputting the plurality of demodulated RF signals.

Effects of the Invention

According to the present invention, it is possible to perform beamforming for transmission/reception antennas without using control of a base station apparatus and information regarding the distance of an optical fiber while curbing degradation of wavelength utilization efficiency and an increase in cost in a wireless communication system using an RoF.

DESCRIPTION OF EMBODIMENTS

Basic Embodiment

Figure 1:
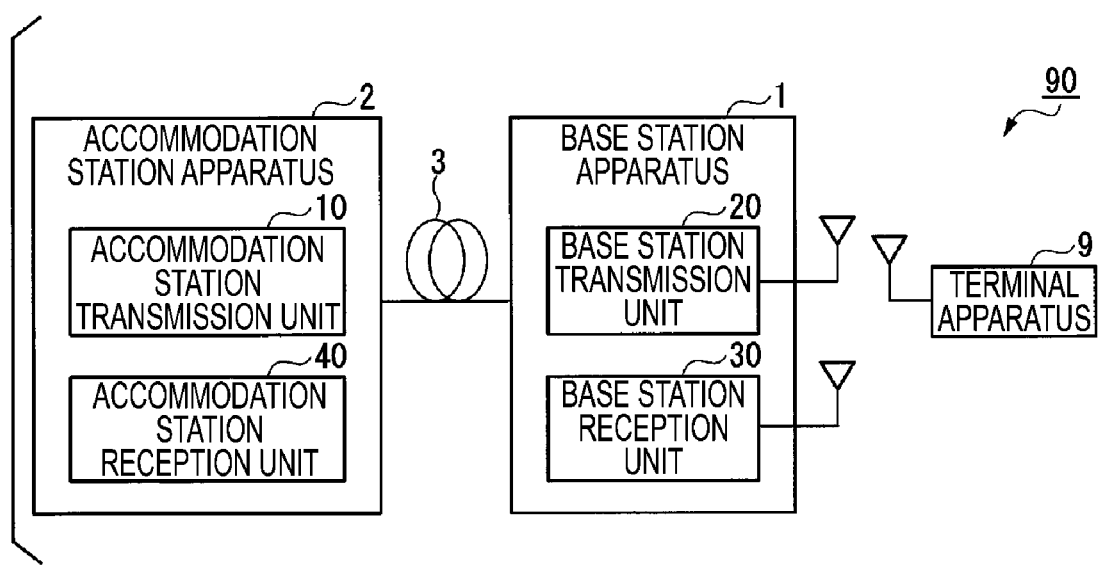
FIG. 1 is a block diagram illustrating a configuration of a basic embodiment.

Hereinafter, embodiments of the present invention will be described with reference to the drawings. FIG. 1 is a block diagram illustrating a configuration of a wireless communication system 90 according to an embodiment of the present invention. The wireless communication system 90 includes an accommodation station apparatus 2, a base station apparatus 1, a terminal apparatus 9, and an optical fiber 3 connecting the accommodation station apparatus 2 to the base station apparatus 1.

The accommodation station apparatus 2 includes an accommodation station transmission unit 10 and an accommodation station reception unit 40. The base station apparatus 1 includes a base station transmission unit 20 and a base station reception unit 30. The accommodation station transmission unit 10 transmits an optical signal modulated with an RF signal to the base station transmission unit 20 through the optical fiber 3. The base station transmission unit 20 receives the optical signal, demodulates the RF signal, and transmits the RF signal to the terminal apparatus 9 through wireless communication. The terminal apparatus 9 transmits the RF signal to the base station reception unit 30 through wireless communication. The base station reception unit 30 receives the RF signal transmitted by the terminal apparatus 9 and transmits the optical signal modulated with the received RF signal to the accommodation station reception unit 40 through the optical fiber 3.

Figure 2:
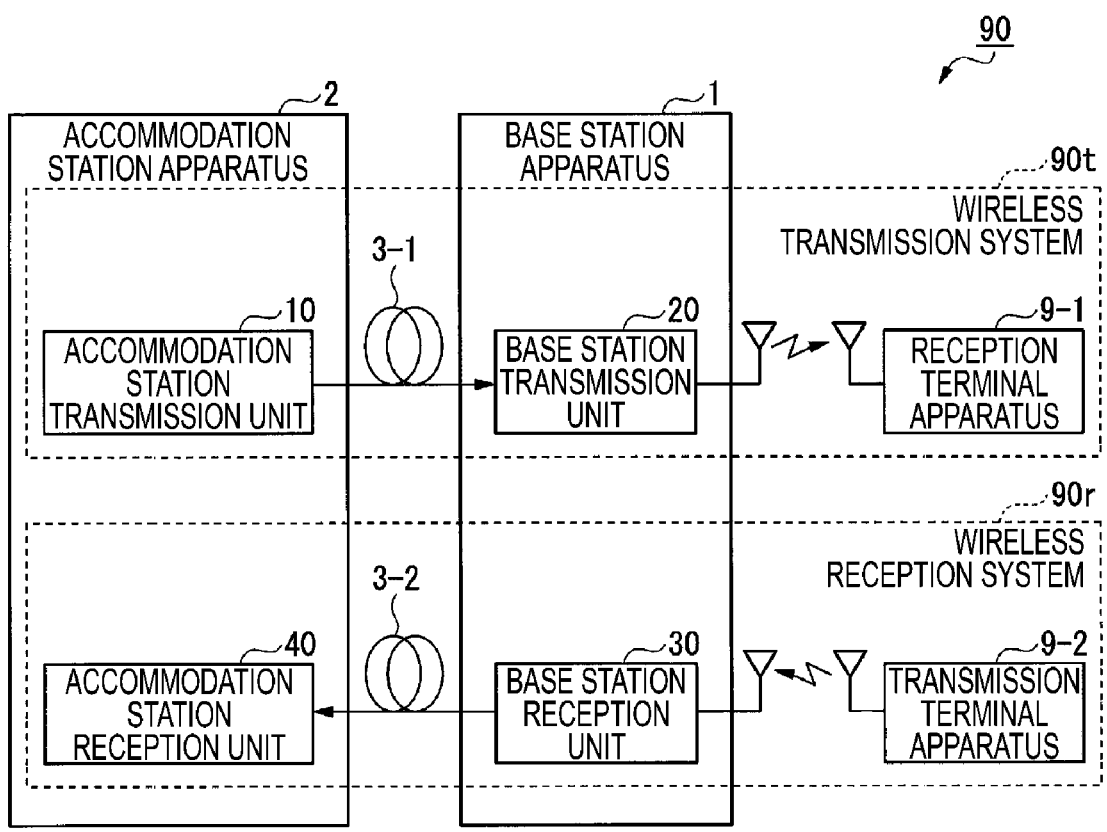
FIG. 2 is a block diagram illustrating the basic embodiment in a separated manner for a wireless transmission system and a wireless reception system.

FIG. 2 is a block diagram illustrating the wireless communication system 90 in a separated manner for a transmission side and a reception side. FIG. 2 illustrates the terminal apparatus 9 in FIG. 1 in a separated manner for a reception terminal apparatus 9-1 configured to perform only reception of the RF signal and a transmission terminal apparatus 9-2 configured to perform only transmission of the RF signal for convenience of explanation. Further, the optical fiber 3 is assumed to have two cores, and a downstream optical fiber 3-1 configured to transmit the RF signal to the reception terminal apparatus 9-1 and an upstream optical fiber 3-2 configured to transmit the RF signal from the transmission terminal apparatus 9-2 are illustrated in a separated manner for convenience of explanation.

If the wireless communication system 90 is separated into a transmission side and a reception side, the wireless communication system 90 can be represented as a wireless transmission system 90$t$ and a wireless reception system 90$r$. The wireless transmission system 90$t$ includes an accommodation station transmission unit 10, a downstream optical fiber 3-1, a base station transmission unit 20, and a reception terminal apparatus 9-1. The wireless reception system 90$r$ includes a transmission terminal apparatus 9-2, a base station reception unit 30, an upstream optical fiber 3-2, and an accommodation station reception unit 40.

Hereinafter, wireless transmission systems 90$t$ on the transmission side in a single mode, that is, with a configuration of transmitting and receiving a beam of a single RF signal will be described as wireless transmission systems 90$t$1$a$ and 90$t$1$b$ in a first embodiment. Further, wireless reception systems 90$r$ on the reception side in a single mode will be described as wireless reception systems 90$r$1$a$ and 90$r$1$b$ in a second embodiment.

In addition, wireless transmission systems 90$t$ on the transmission side in a multi mode, that is, with a configuration of transmitting and receiving beams of a plurality of RF signals will be described as wireless transmission systems 90$t$2$a$ and 90$t$2$b$ in a third embodiment. Moreover, wireless reception systems 90$r$ on the reception side in multi mode will be described as wireless reception systems 90$r$2$a$ and 90$r$2$b$ in a fourth embodiment.

First Embodiment: Transmission Side in Single Mode "Application Example of Reflect Array"

Figure 3:
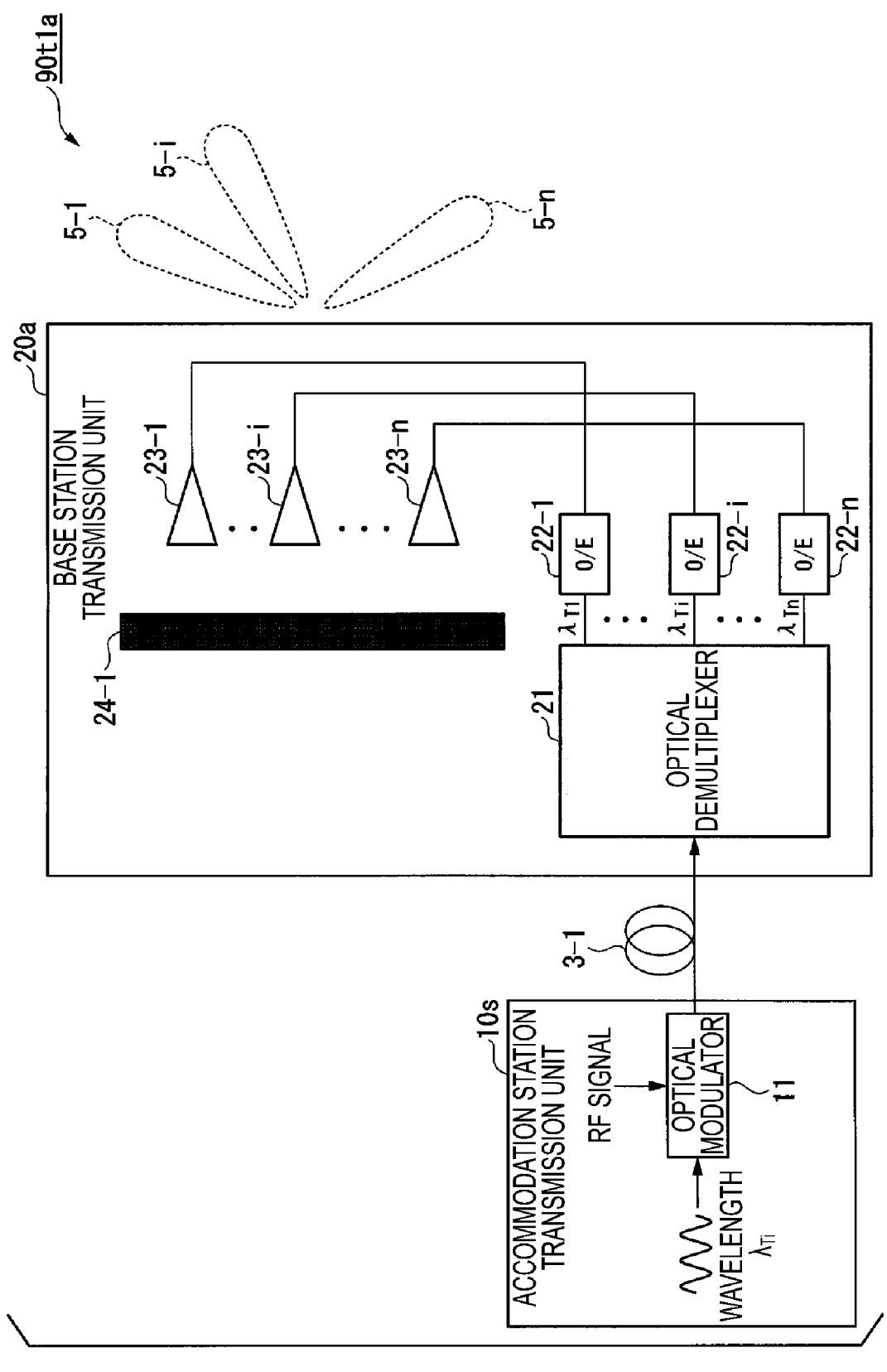
FIG. 3 is a block diagram illustrating a configuration of a wireless transmission system according to a first embodiment.

FIG. 3 is a block diagram illustrating a configuration of the wireless transmission system 90$t$1$a$ according to the first embodiment. The wireless transmission system 90$t$1$a$ includes an accommodation station transmission unit 10$s$, a base station transmission unit 20$a$, a downstream optical fiber 3-1, and a reception terminal apparatus 9-1 which is illustrated not in FIG. 3 but in FIG. 2.

The accommodation station transmission unit 10$s$ includes an optical modulator 11. The optical modulator 11 obtains light of a single wavelength $\lambda_{Ti}$ arbitrary selected from light of n wavelengths $\lambda_{T1}$ to $\lambda_{Tn}$, performs intensity modulation with an RF signal to be transmitted using the light of the wavelength $\lambda_{Ti}$ as an optical carrier, and generates an optical signal of the wavelength $\lambda_{Ti}$. Here, the wavelengths $\lambda_{T1}$ to $\lambda_{Tn}$ are mutually different wavelengths, n is an integer that is equal to or greater than two, and i is any value from 1 to n. The optical modulator 11 outputs the generated optical signal with the wavelength $\lambda_{T1}$ to the downstream optical fiber 3-1.

Figure 4:
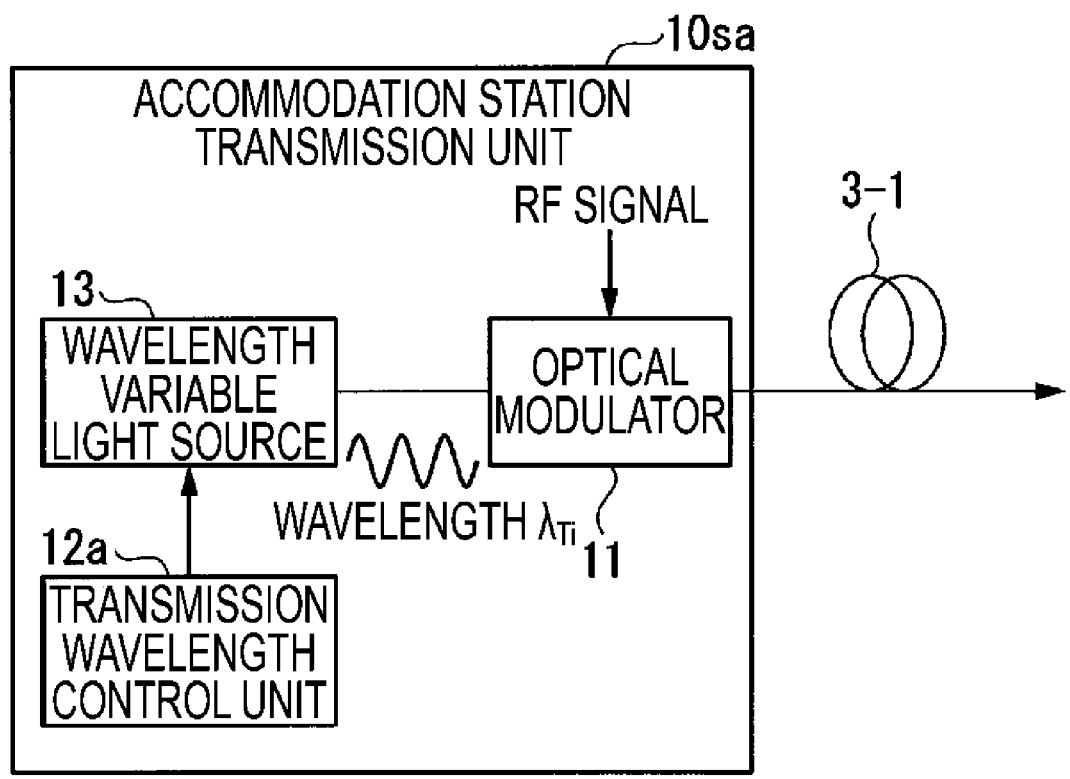
FIG. 4 is a block diagram illustrating an internal configuration of an accommodation station transmission unit according to the first embodiment.

FIG. 4 is a block diagram illustrating an internal configuration of an accommodation station transmission unit 10$sa$, which is an example of a specific configuration of an accommodation station transmission unit 10$s$ configured to generate light of a single wavelength $\lambda_{Ti}$. Note that the optical modulator 11 illustrated in FIG. 4 has the same configuration as that of the optical modulator 11 in FIG. 3. The accommodation station transmission unit 10$sa$ illustrated in FIG. 4 includes an optical modulator 11, a transmission wavelength control unit 12a, and a wavelength variable light source 13.

The transmission wavelength control unit 12a outputs a control signal for designating a wavelength of light to be generated to the wavelength variable light source 13. The wavelength variable light source 13 generates light of any one arbitrary wavelength $\lambda_{Ti}$ from among the wavelengths $\lambda_{T1}$ to $\lambda_{Tn}$. Once the wavelength variable light source 13 receives the control signal output by the transmission wavelength control unit 12a, the wavelength variable light source 13 generates and outputs the light of the wavelength $\lambda_{Ti}$ designated by the control signal. In other words, the wavelength $\lambda_{T1}$ of the optical signal generated and output by the optical modulator 11 is switched by the transmission wavelength control unit 12a switching the wavelength designated by the control signal.

Returning to FIG. 3, the downstream optical fiber 3-1 delivers the optical signal of the wavelength $\lambda_{Ti}$ output by the optical modulator 11 to the base station transmission unit 20a. The base station transmission unit 20a includes an optical demultiplexer 21, n O/E converters (in the specification, the "O/E converters" may also be referred to as "photoelectric converters") 22-1 to 22-n, n transmission antennas 23-1 to 23-n, and a reflect array 24-1 which is a transmission beam formation unit configured to form a transmission beam.

The optical demultiplexer 21 includes one input port and n output ports, and the one input port is connected to the downstream optical fiber 3-1. Each of then output ports of the optical demultiplexer 21 is assigned to each of the n wavelengths $\lambda_{T1}$ to $\lambda_{Tn}$ in a fixed manner. The O/E converters 22-1 to 22-n are connected to the n output ports, respectively, and for example, the wavelengths $\lambda_{T1}$, $\lambda_{T2}$, . . . , $\lambda_{Ti}$, . . . , $\lambda_{Tn}$ are assigned in a fixed manner in the order from the output port to which the O/E converter 22-1 is connected.

The optical demultiplexer 21 obtains the optical signal transmitted through the downstream optical fiber 3-1, demultiplexes the obtained optical signal for each wavelength, and each of the demultiplexed optical signals is branched and output to the output port corresponding to each wavelength. Each of the O/E converters 22-1 to 22-n obtains the optical signals output by the optical demultiplexer 21 from the n output ports and converts the obtained optical signals into electrical signals, thereby demodulating and outputting the RF signals superimposed on the optical signals.

Each of the transmission antennas 23-1 to 23-n is connected to the O/E converters 22-1 to 22-n and emits radio waves of the RF signals output by the O/E converters 22-1 to 22-n.

The reflect array 24-1 has a plane for receiving the radio waves of the RF signals. The reflect array 24-1 is disposed at a position at which the radio waves of the RF signals emitted by the transmission antennas 23-1 to 23-n can be received by the plane.

An element configured to reflect the radio waves of the RF signals is formed on the plane of the reflect array 24-1, and if the element receives the RF signals, the element changes phases of the RF signals to strengthen each other in phase in a specific direction and reflects the RF signals (hereinafter, the action of the element on the RF signals will be represented with an expression that "the reflect array reflects the RF signals").

If a radio wave of an RF signal emitted by a certain transmission antenna, for example, the transmission antenna 23-i is reflected by the reflect array 24-1, then the reflected radio wave of the RF signal is strengthened in the same phase in a specific direction, and a transmission beam 5-i is formed in the specific direction. The amount of change in phase of the radio wave of the RF signal is different in accordance with each of the positions of the transmission antennas 23-1 to 23-n that emit the radio waves of the RF signals. Thus, because the n RF signals emitted by the transmission antennas 23-1 to 23-n are reflected by the reflect array 24-1 and strengthen each other in phase in different directions, and transmission beams 5-1 to 5-n are formed in the different directions.

Figure 5:
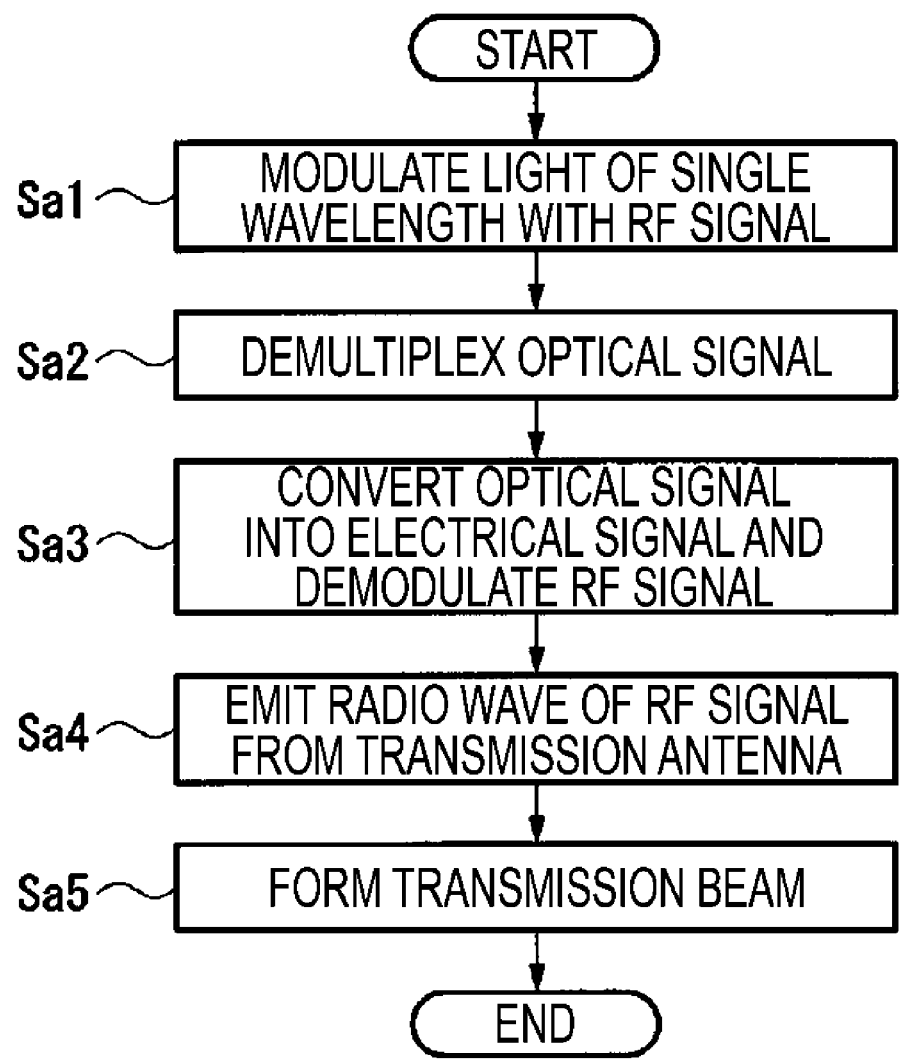
FIG. 5 is a flowchart illustrating a flow of processing performed by the wireless transmission system according to the first embodiment.

Processing Performed by Wireless Transmission System According to First Embodiment FIG. 5 is a flowchart illustrating a flow of processing performed by the wireless transmission system 90t1a according to the first embodiment. The following description will be given on the assumption that the accommodation station transmission unit 10sa illustrated in FIG. 4, for example, is provided as the accommodation station transmission unit 10s.

The transmission wavelength control unit 12a of the accommodation station transmission unit 10sa outputs, to the wavelength variable light source 13, a control signal for designating the wavelength $\lambda_{Ti}$ as any one of the wavelengths. The wavelength variable light source 13 generates light of the wavelength $\lambda_{Ti}$ designated by the control signal and outputs the light to the optical modulator 11. The optical modulator 11 performs intensity modulation with the RF signal to be transmitted and generates an optical signal using the light of the wavelength $\lambda_{Ti}$ output by the wavelength variable light source 13 as an optical carrier. The optical modulator 11 outputs the generated optical signal to the downstream optical fiber 3-1 (Step Sa1).

The downstream optical fiber 3-1 delivers the optical signal output by the optical modulator 11 to the optical demultiplexer 21 of the base station transmission unit 20a. The optical demultiplexer 21 demultiplexes the optical signal obtained from the downstream optical fiber 3-1 into the n wavelengths $\lambda_{T1}$ to $\lambda_{Tn}$. By the optical demultiplexer 21, each of the demultiplexed optical signals is branched to the output port corresponding to the wavelength and output to the O/E converters 22-1 to 22-n connected to the output ports (Step Sa2).

Here, the optical signal output by the optical modulator 11 is only the optical signal of the wavelength $\lambda_{Ti}$. Thus, the optical demultiplexer 21 demultiplexes only the optical signal of the wavelength $\lambda_{Ti}$, and only the O/E converter 22-i connected to the output port corresponding to the wavelength $\lambda_{Ti}$ obtains the optical signal. The O/E converter 22-i converts the optical signal of the wavelength $\lambda_{Ti}$ branched and output by the optical demultiplexer 21 into an electrical signal and demodulates the RF signal (Step Sa3).

The O/E converter 22-i outputs the demodulated RF signal to the transmission antenna 23-i. The transmission antenna 23-i emits the radio wave of the RF signal output by the O/E converter 22-i (Step Sa4). If the radio wave of the RF signal emitted by the transmission antenna 23-i is reflected by the reflect array 24-1, the transmission beam 5-i is formed in a specific direction depending on the position of the transmission antenna 23-i (Step Sa5). The reception terminal apparatus 9-1 receives and obtains the RF signal transmitted by the transmission beam 5-i.

Figure 6:
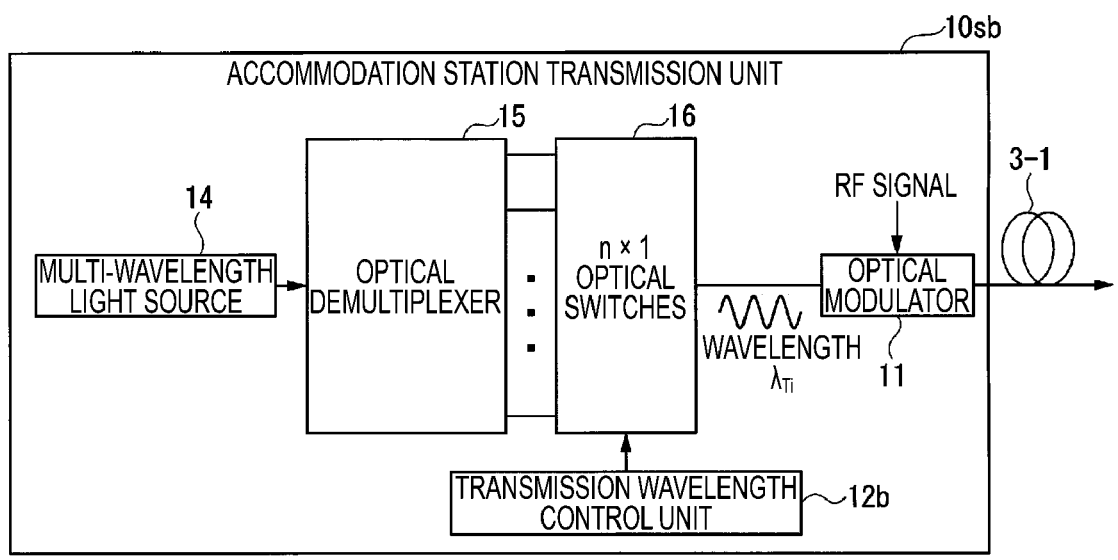
FIG. 6 is a block diagram illustrating an internal configuration of another configuration example of the accommodation station transmission unit according to the first embodiment.

Another Configuration Example of Accommodation Station Transmission Unit According to First Embodiment Note that an accommodation station transmission unit 10sb illustrated in FIG. 6 may be applied instead of the accommodation station transmission unit 10sa illustrated in FIG. 4 as the accommodation station transmission unit 10s. The accommodation station transmission unit 10sb illustrated in FIG. 6 includes an optical modulator 11, a transmission wavelength control unit 12b, a multiple-wavelength light source 14, an optical demultiplexer 15, and n×1 optical switches 16. Note that the optical modulator 11 illustrated in FIG. 6 has the same configuration as that of the optical modulator 11 in FIG. 3.

The multiple-wavelength light source 14 generates and outputs light of the wavelengths $\lambda_{T1}$ to $\lambda_{Tn}$. The optical demultiplexer 15 includes one input port and n output ports, and each of the n output ports is assigned to each of the n wavelengths $\lambda_{T1}$ to $\lambda_{Tn}$ in a fixed manner. The optical demultiplexer 15 demultiplexes the light of the wavelengths $\lambda_{T1}$ to $\lambda_{Tn}$ output by the multiple-wavelength light source 14 for each wavelength, and the demultiplexed light is branched and output to the output port corresponding to the wavelengths of the demultiplexed light.

The n×1 optical switches 16 include n input ports and one output port, and each of the n input ports is connected to each of then output ports of the optical demultiplexer 15. The n×1 optical switches 16 changes the switches based on a control signal received from the transmission wavelength control unit 12b and connects any one of the n input ports to the output port.

The transmission wavelength control unit 12b outputs, to the n×1 optical switches 16, a control signal to connect, to the output port, the input port that obtains, from the optical demultiplexer 15, the light of the one wavelength $\lambda_{Ti}$ sent to the optical modulator 11. The wavelength of the optical signal generated and output by the optical modulator 11 is switched by the transmission wavelength control unit 12b switching an output port that is a connecting destination of the input port of the n×1 optical switches 16 using the control signal.

In a case in which the accommodation station transmission unit 10sb is applied and the transmission beam 5-i is formed, in Step Sa1 in FIG. 5, the transmission wavelength control unit 12b of the accommodation station transmission unit 10sb outputs, to the n×1 optical switches 16, a control signal that connects the input port for obtaining the wavelength $\lambda_{Ti}$ from the optical demultiplexer 15 to the output port.

Note that in FIG. 6, n light sources that generate light of the wavelengths $\lambda_{T1}$ to $\lambda_{Tn}$ may be applied instead of the multiple-wavelength light source 14 and the optical demultiplexer 15 and each of the n light sources may be connected to each of the input ports of the n×1 optical switches 16.

First Embodiment: Transmission Side in Single Mode "Application Example of Transmit Array"

Figure 7:
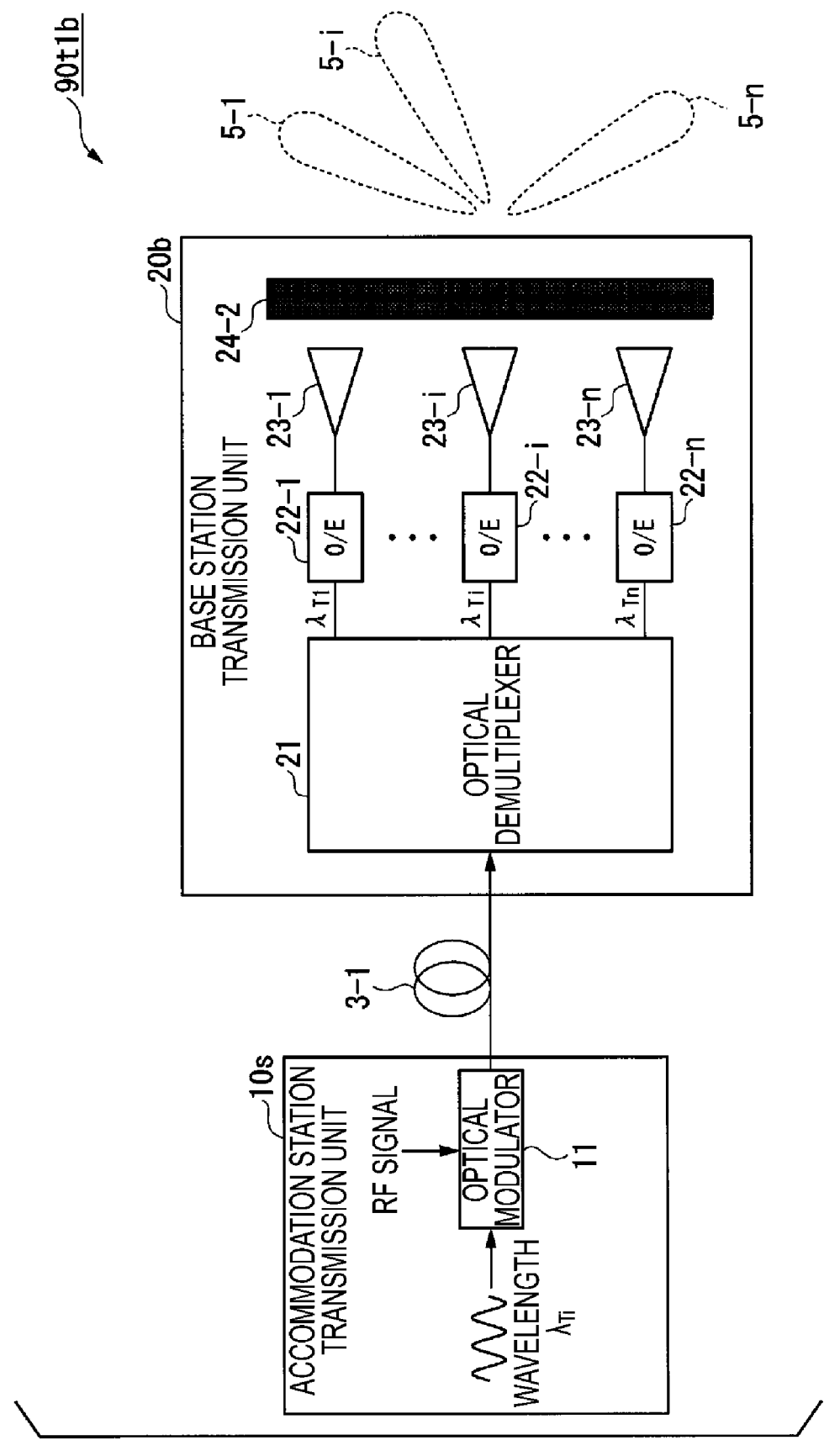
FIG. 7 is a block diagram illustrating another configuration example of the wireless transmission system according to the first embodiment.

FIG. 7 is a block diagram illustrating a configuration of the wireless transmission system 90t1b that is another configuration example of the first embodiment. In FIG. 7, the same reference signs will be applied to the same configurations as those in FIG. 3, and different configurations will be described below. The wireless transmission system 90t1b includes an accommodation station transmission unit 10s, a base station transmission unit 20b, a downstream optical fiber 3-1, and a reception terminal apparatus 9-1 illustrated in FIG. 2 although not illustrated in FIG. 7.

The base station transmission unit 20b includes an optical demultiplexer 21, n O/E converters 22-1 to 22-n, n transmission antennas 23-1 to 23-n, and a transmit array 24-2 that is a transmission beam formation unit configured to form a transmission beam.

The transmit array 24-2 has a plane configured to receive radio waves of RF signals. The transmit array 24-2 is disposed at a position at which the radio waves of the RF signals emitted by the transmission antennas 23-1 to 23-n can be received by the plane. Elements are formed on one plane and the other plane of the transmit array 24-2, and when the element on the one plane receives the radio waves of the RF signals, the element on the other plane changes the phases of the RF signals to strengthen in phase in a specific direction and emits the RF signals (hereinafter, the action of the element on the RF signal may be simply represented with an expression that "the RF signal passes through the transmit array").

When a radio wave of an RF signal emitted by a certain transmission antenna, for example, the transmission antenna 23-i passes through the transmit array 24-2, the radio wave of the RF signal that has passed through the transmit array 24-2 is strengthened in phase in a specific direction, and the transmission beam 5-i is formed in the specific direction. The amount of phase change of the radio wave of the RF signal is different in accordance with each of the positions of the transmission antennas 23-1 to 23-n that emit the radio waves of the RF signals. Thus, because the n RF signals emitted by the transmission antennas 23-1 to 23-n are strengthened in phase in different directions by passing through the transmit array 24-2, transmission beams 5-1 to 5-n are formed in the different directions.

Processing in Another Configuration Example of First Embodiment

In processing performed by the wireless transmission system 90t1b, in Step Sa1 to Sa4, the processing as with the wireless transmission system 90t1a is performed as illustrated in the flowchart of FIG. 5. When the radio wave of the RF signal emitted by the transmission antenna 23-i passes through the transmit array 24-2, then the transmission beam 5-i is formed in the specific direction depending on the position of the transmission antenna 23-i in Step Say. The reception terminal apparatus 9-1 receives and obtains the RF signal transmitted by the transmission beam 5-i.

Note that the accommodation station transmission unit 10sa illustrated in FIG. 4 may be applied or the accommodation station transmission unit 10sb illustrated in FIG. 6 may be applied as the accommodation station transmission unit 10s included in the wireless transmission system 90t1b similarly to the wireless transmission system 90t1a.

In the wireless communication systems 90t1a and 90t1b according to the first embodiment, the accommodation station transmission unit 10s includes one optical modulator 11, and based on the RF signal, the optical modulator 11 modulates the light of the single wavelength $\lambda_{Ti}$, generates an optical signal, and outputs the generated optical signal. The base station transmission units 20a and 20b include the optical demultiplexer 21, the transmission antennas 23-1 to 23-n, the O/E converters 22-1 to 22-n, and the reflect array 24-1, or the transmit array 24-2. The optical demultiplexer 21 includes a plurality of output ports associated to each wavelength of light, obtains the optical signal output by the accommodation station transmission unit 10s from the input port, demultiplexes the obtained optical signal for each wavelength, and outputs the demultiplexed optical signals from the output ports of the corresponding wavelengths. Each of the O/E converters 22-1 to 22-n is connected to the plurality of output ports of the optical demultiplexer 21, converts the optical signals output by the optical demultiplexer 21 into electrical signals to demodulate the RF signals, and outputs the demodulated RF signals. The transmission antennas 23-1 to 23-n are connected to the O/E converters 22-1 to 22-n, respectively, and the transmission antenna 23-i emits the RF signal output by the O/E converter 22-i. The reflect array 24-1 or the transmit array 24-2 receives the RF signal emitted by the transmission antenna 23-i and forms the transmission beam 5-i in a direction in accordance with the position of the transmission antenna 23-i that is a transmission source of the received RF signal.

In a case in which the reception terminal apparatus 9-1 that serves as a transmission destination of an RF signal to be transmitted, for example, is replaced with another reception terminal apparatus 9-1 in the aforementioned wireless transmission systems 90t1a and 90t1b, the transmission wavelength control unit 12a of the accommodation station transmission unit 10sa gives a control signal to designate the wavelength $\lambda_{Tj}$ instead of the wavelength $\lambda_{Ti}$ to the wavelength variable light source 13 (here, j is any value from 1 to n and it is assumed that i≠j). In this manner, the reflect array 24-1 or the transmit array 24-2 can form the transmission beam 5-j in a direction that is different from the direction of the transmission beam 5-i, and the other reception terminal apparatus 9-1 can receive the RF signal transmitted with the transmission beam 5-j. The same applies to a case in which one reception terminal apparatus 9-1 moves. This is because each of the n wavelengths $\lambda_{T1}$ to $\lambda_{Tn}$ is correlated with one of the transmission antennas 23-1 to 23-n in a fixed manner by the optical demultiplexer 21. In other words, it is possible to state that each of the n wavelengths $\lambda_{T1}$ to $\lambda_{Tn}$ and each of the n transmission beams 5-1 to 5-n are correlated in a one-to-one relationship. Thus, it is possible to switch the transmission beams 5-1 to 5-n to be formed by the base station transmission units 20a and 20b merely by switching the wavelengths $\lambda_{T1}$ to $\lambda_{Tn}$ in the accommodation station transmission unit 10s.

The aforementioned wireless transmission systems 90t1a an 90t1b perform only control of selecting the wavelength $\lambda_{Ti}$ of the optical signal to be modulated with the RF signal transmitted by the accommodation station transmission unit 10s of the accommodation station apparatus 2, and it is not necessary for the base station apparatus 1 to perform any control at all. In addition, information regarding the distance of the downstream optical fiber 3-1 is not needed, and the number of wavelengths used is limited to the number of transmission antennas 23-1 to 23-n.

Figure 26:
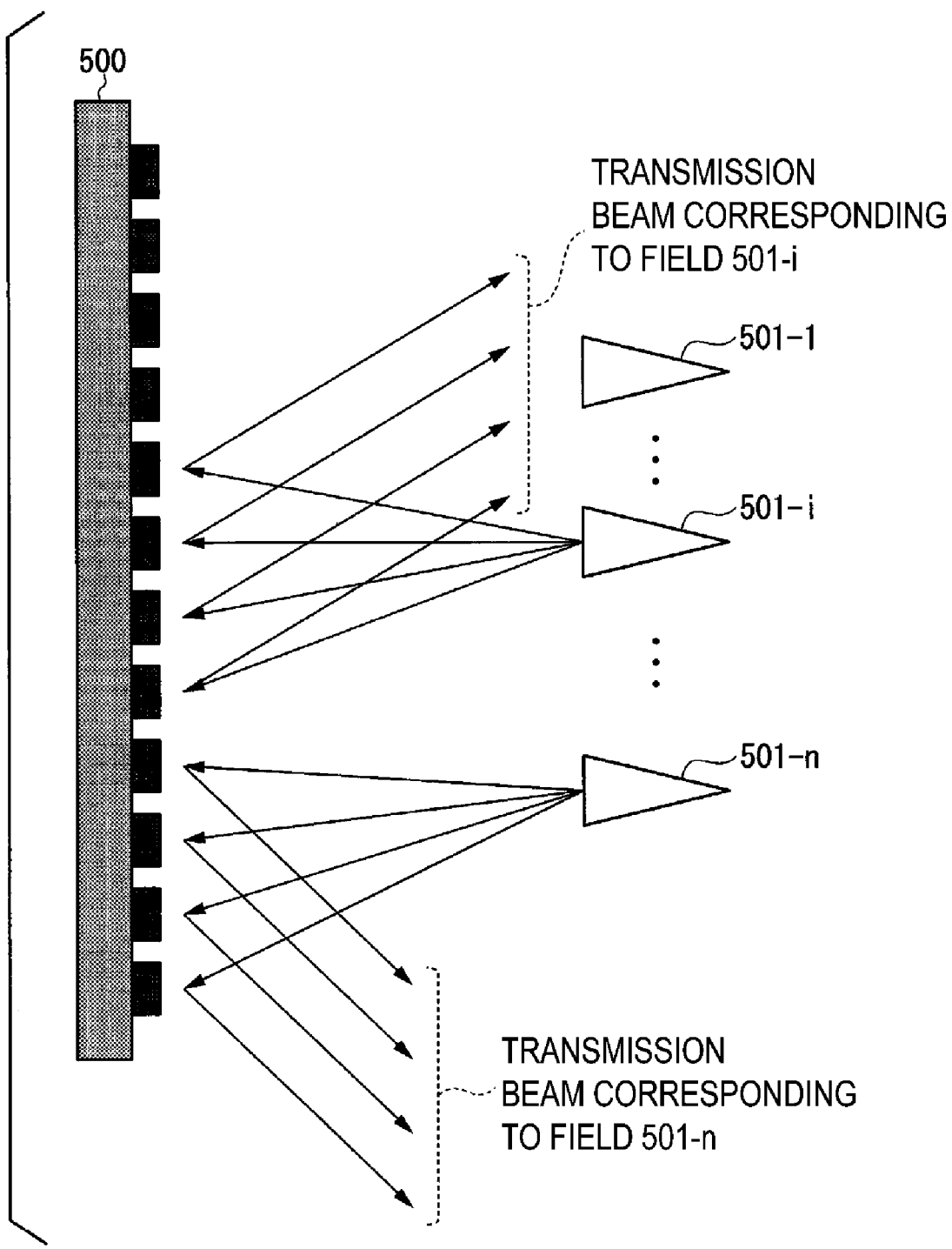
FIG. 26 is a diagram illustrating a beamforming method using a reflect array.
Figure 27:
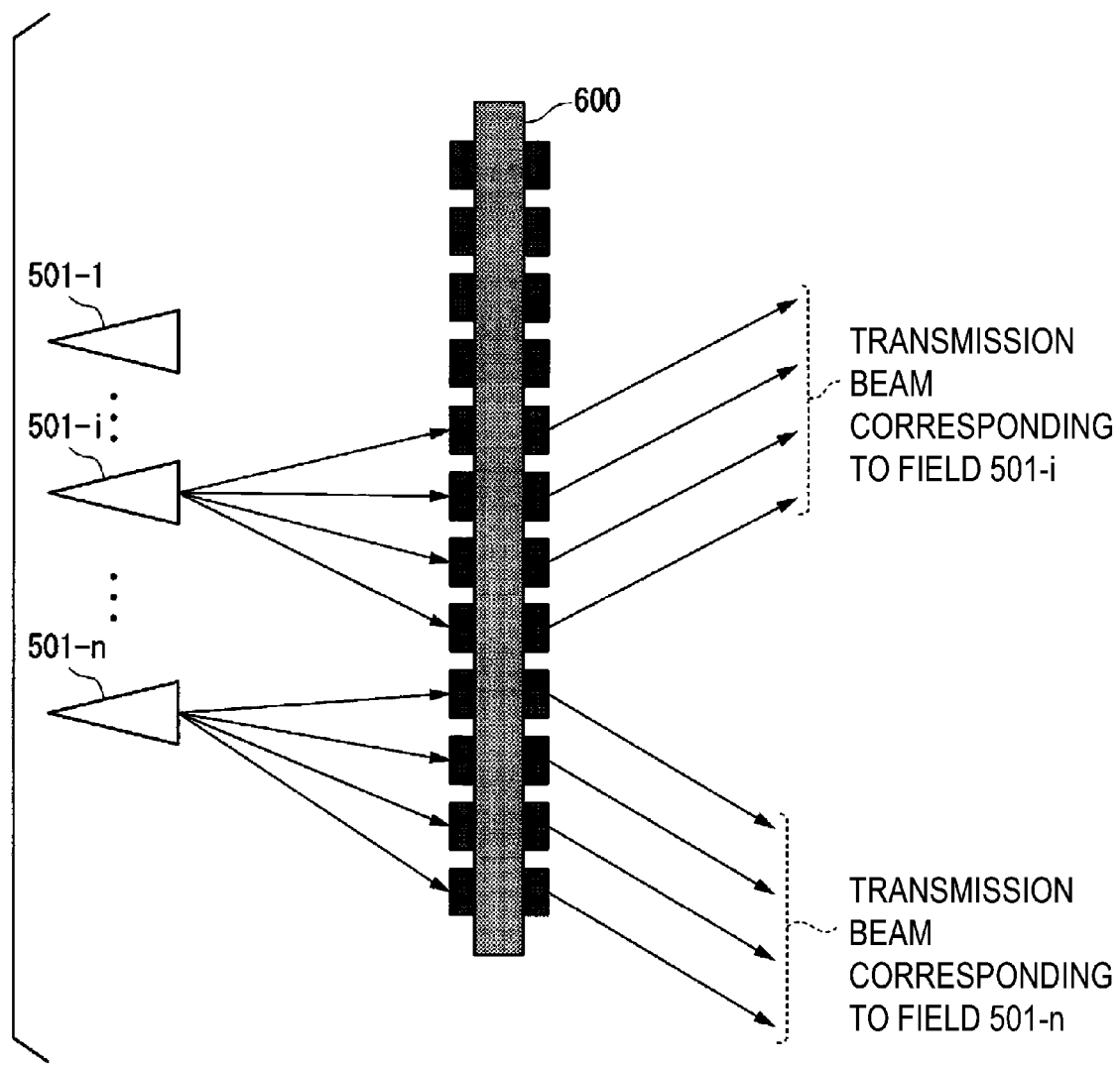
FIG. 27 is a diagram illustrating a beamforming method using a transmit array.

In a case in which an RoF transmission configuration is realized using the technique described in NPL 2, a certain feed 501-i is selected from among a plurality of feeds 501-1 to 501-n illustrated in FIGS. 26 and 27 to emit a radio wave of an RF signal. In this case, 1×n switches that perform electrical switching are used, the RF signal is given to one input port of the 1×n switches, for example, and each of the n feeds 501-1 to 501-n is connected to each of n output ports of the 1×n switches. There is a problem that a loss occurs when the RF signal passes through the 1×n switches, and the loss generally increases as the value of n increases.

On the other hand, no switches are present in the case of the accommodation station transmission unit 10sa illustrated in FIG. 4 in the wireless transmission systems 90t1a and 90t1b. Further, in the case of the accommodation station transmission unit 10sb illustrated in FIG. 6, a configuration in which the transmission antenna 23-i which emits the radio wave of the RF signal is selected through processing of changing switching of the n×1 optical switches 16 configured to optically perform switching is employed.

Thus, it is possible to perform switching with a lower loss as compared with the processing of electrically switching the transmission antenna 23-i to emit the radio wave of the RF signal. Thus, it is thus possible to perform beamforming for the transmission/reception antennas without using control of the base station apparatus 1 and the information regarding the distance of the optical fiber while curbing degradation of wavelength utilization efficiency and an increase in cost.

Second Embodiment: Reception Side in Single Mode "Application Example of Reflect Array"

Figure 8:
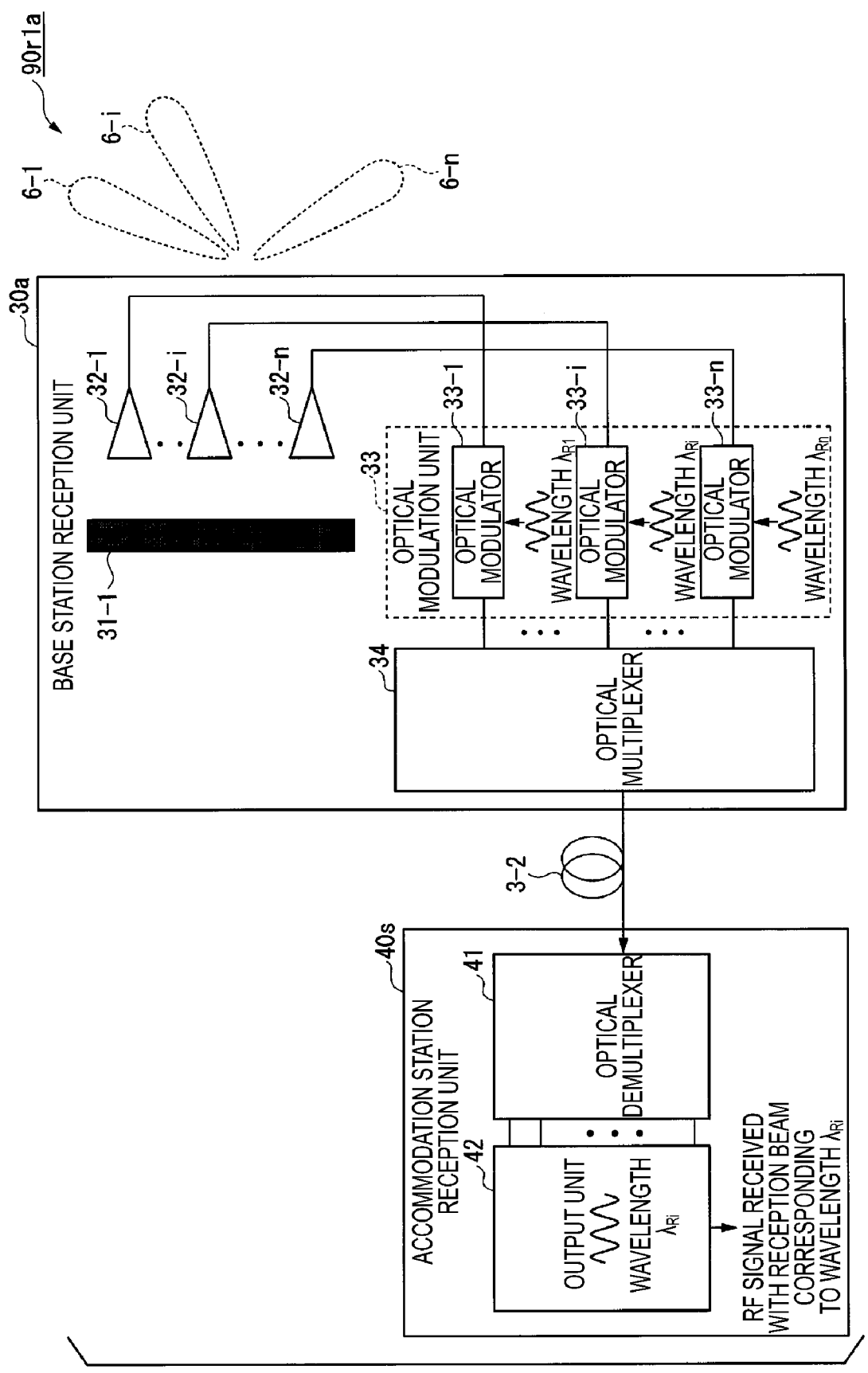
FIG. 8 is a block diagram illustrating a configuration of a wireless reception system according to a second embodiment.

FIG. 8 is a block diagram illustrating a configuration of a wireless reception system 90r1a according to the second embodiment. The wireless reception system 90r1a includes an accommodation station reception unit 40s, a base station reception unit 30a, an upstream optical fiber 3-2, and a transmission terminal apparatus 9-2 which is illustrated not in FIG. 8 but in FIG. 2.

The base station reception unit 30a includes a reflect array 31-1 that is a reception beam formation unit for converging received RF signals, n reception antennas 32-1 to 32-n, an optical modulation unit 33, and an optical multiplexer 34. The reflect array 31-1 has the same configuration as that of the reflect array 24-1 according to the first embodiment, and these reflect arrays have reversibility.

As described above with reference to FIG. 3, if a radio wave of an RF signal is emitted from the transmission antenna 23-i, for example, the radio wave of the RF signal is reflected by the reflect array 24-1. When the reflect array 24-1 reflects the radio wave of the RF signal, the radio wave of the RF signal is strengthened in phase in a specific direction in accordance with the position of the transmission antenna 23-i, and the transmission beam 5-i is formed.

For example, it is assumed that an RF signal of the same frequency as that of the RF signal with which the transmission beam 5-i is formed has arrived from the traveling direction of the transmission beam 5-i. The reversibility of the reflect array means that if the reflect array 24-1 reflects the RF signal arriving in the direction of the transmission beam 5-i, the RF signal converges at the position of the transmission antenna 23-i. Thus, if the reception antenna 32-i is disposed at the position of the transmission antenna 23-i, for example, the reception antenna 32-i can perform same-phase synthesis on the RF signal arriving in the direction of the transmission beam 5-i and receive the RF signal. It is thus possible to form a reception beam 6-i by selecting the RF signal to be received by the reception antenna 32-i. For this reason, the reflect array 31-1 and the n reception antennas 32-1 to 32-n illustrated in FIG. 8 are disposed in a positional relationship in accordance with arriving directions of reception beams 6-1 to 6-n such that the reception beams 6-1 to 6-n arriving in the mutually different directions can be received.

The reception antennas 32-1 to 32-n receive and output the radio wave of the RF signal that the reflect array 31-1 converges at each of the positions of the reception antennas 32-1 to 32-n.

Figure 9:
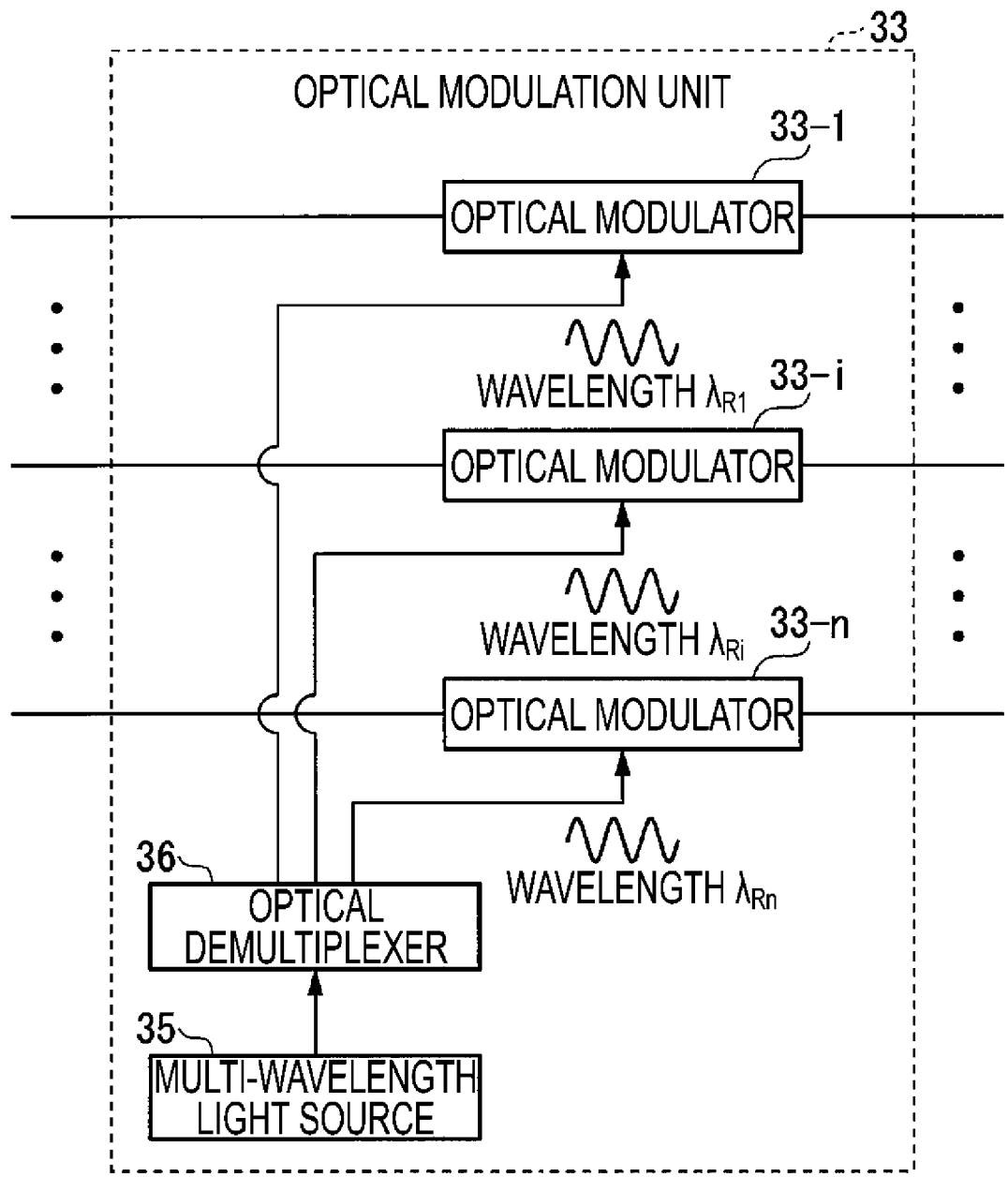
FIG. 9 is a block diagram illustrating an internal configuration of an optical modulation unit according to the second embodiment.

The optical modulation unit 33 includes an internal configuration illustrated in FIG. 9. The optical modulation unit 33 includes n optical modulators 33-1 to 33-n, an optical demultiplexer 36, and a multiple-wavelength light source 35. The multiple-wavelength light source 35 generates light of n different wavelengths $\lambda_{R1}$ to $\lambda_{Rn}$ and outputs the generated light to the optical demultiplexer 36. Here, each of the wavelengths $\lambda_{T1}$ to $\lambda_{Tn}$ may be a wavelength that is different from each of the wavelengths $\lambda_{T1}$ to $\lambda_{Tn}$ or may be the same wavelength as each of the wavelengths $\lambda_{T1}$ to $\lambda_{Tn}$.

The optical demultiplexer 36 includes one input port and n output ports. Each of the n output ports is assigned to each of then wavelengths $\lambda_{R1}$ to $\lambda_{Rn}$ in a fixed manner and is connected to each of the optical modulators 33-1 to 33-n. The optical demultiplexer 36 demultiplexes the light output by the multiple-wavelength light source 35 for each wavelength, the demultiplexed light is branched and output to the optical modulators 33-1 to 33-n connected to the output ports of the corresponding wavelengths.

The optical modulators 33-1 to 33-n obtains RF signals output by the reception antennas 32-1 to 32-n that are connected to the optical modulators 33-1 to 33-n. The optical modulators 33-1 to 33-n performs intensity modulation with the obtained RF signals and generates and outputs optical signals using the light of the wavelengths $\lambda_{T1}$ to $\lambda_{Tn}$ sent to each of the optical modulators 33-1 to 33-n from the optical demultiplexer 36 as an optical carrier.

Note that in FIG. 9, n light sources configured to generate light of the wavelengths $\lambda_{R1}$ to $\lambda_{Rn}$ are applied instead of the multiple-wavelength light source 35 and the optical demultiplexer 36 and each of the n light sources may be connected to each of the optical modulators 33-1 to 33-n. Alternatively, m direct optical modulators configured to generate light of the wavelengths $\lambda_{R1}$ to $\lambda_{Rn}$ may be used instead of the multiple-wavelength light source 35, the optical demultiplexer 36, and the optical modulators 33-1 to 33-n.

Returning to FIG. 8, the optical multiplexer 34 multiplexes the n optical signals of the wavelengths $\lambda_{T1}$ to $\lambda_{Tn}$ output by each of the optical modulators 33-1 to 33-n and outputs the multiplexed optical signal to the upstream optical fiber 3-2. The upstream optical fiber 3-2 delivers, to the accommodation station reception unit 40s, the optical signal obtained by multiplexing the n wavelengths $\lambda_{R1}$ to $\lambda_{Rn}$ output by the optical multiplexer 34.

The accommodation station reception unit 40s includes an optical demultiplexer 41 and an output unit 42. The optical demultiplexer 41 includes one input port and n output ports, and each of then output ports is assigned to each of then wavelengths $\lambda_{R1}$ to $\lambda_{Rn}$ in a fixed manner. The optical demultiplexer 41 obtains the optical signal delivered by the upstream optical fiber 3-2 from the input port and demultiplexes the obtained optical signal for each wavelength. By the optical demultiplexer 41, each of the demultiplexed optical signals is branched and output to the output port corresponding to a wavelength of each of the demultiplexed optical signals.

The output unit 42 obtains the optical signals output by the optical demultiplexer 41 from the output ports and selects an optical signal corresponding to any one wavelength $\lambda_{Ri}$ from among the optical signals obtained from the output ports. The output unit 42 converts the selected optical signal into an electrical signal, demodulates the RF signal, and outputs the demodulated RF signal.

Figure 10:
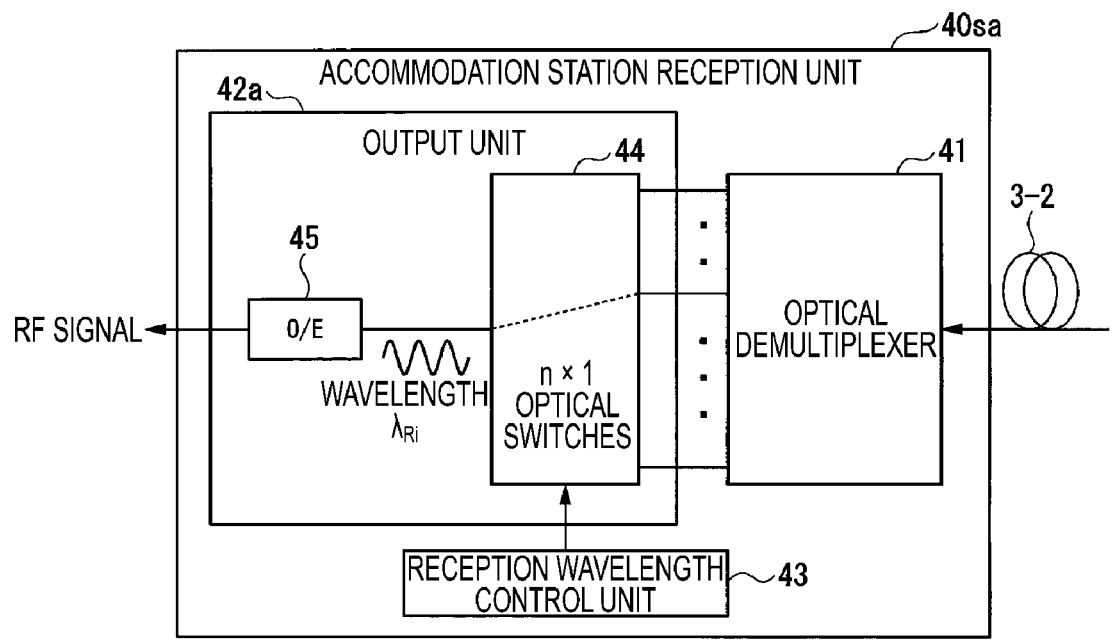
FIG. 10 is a block diagram illustrating an internal configuration of an accommodation station reception unit according to the second embodiment.

FIG. 10 is a block diagram illustrating an internal configuration of an accommodation station reception unit 40sa which is an example of a specific configuration of the accommodation station reception unit 40s. Note that the optical demultiplexer 41 illustrated in FIG. 10 has the same configuration as that of the optical demultiplexer 41 in FIG. 8. The accommodation station reception unit 40sa illustrated in FIG. 10 includes an optical demultiplexer 41, an output unit 42a, and a reception wavelength control unit 43. The output unit 42a includes n×1 optical switches 44 and an O/E converter 45.

The n×1 optical switches 44 include n input ports and one output port, and each of the n input ports is connected to each of then output ports of the optical demultiplexer 41. Based on a control signal received from the reception wavelength control unit 43, the n×1 optical switches 44 switches and connects any one of the n input ports to the output port. The O/E converter 45 converts the optical signal output by the n×1 optical switches 44 from the output port into an electrical signal to demodulate an RF signal, and outputs the demodulated RF signal. The RF signal is an RF signal received with the reception beam 6-i.

The reception wavelength control unit 43 outputs, to the n×1 optical switches 44, a control signal for connecting, to the output port, the input port that obtains, from the optical demultiplexer 41, the light of the one wavelength $\lambda_{Ri}$ on which the RF signal is superimposed. The wavelength $\lambda_{Ri}$ of the light on which the RF signal that is an output target is superimposed is switched by the reception wavelength control unit 43 switching the output port that is a connecting destination of the input port of the n×1 optical switches 44 using the control signal.

Figure 11:
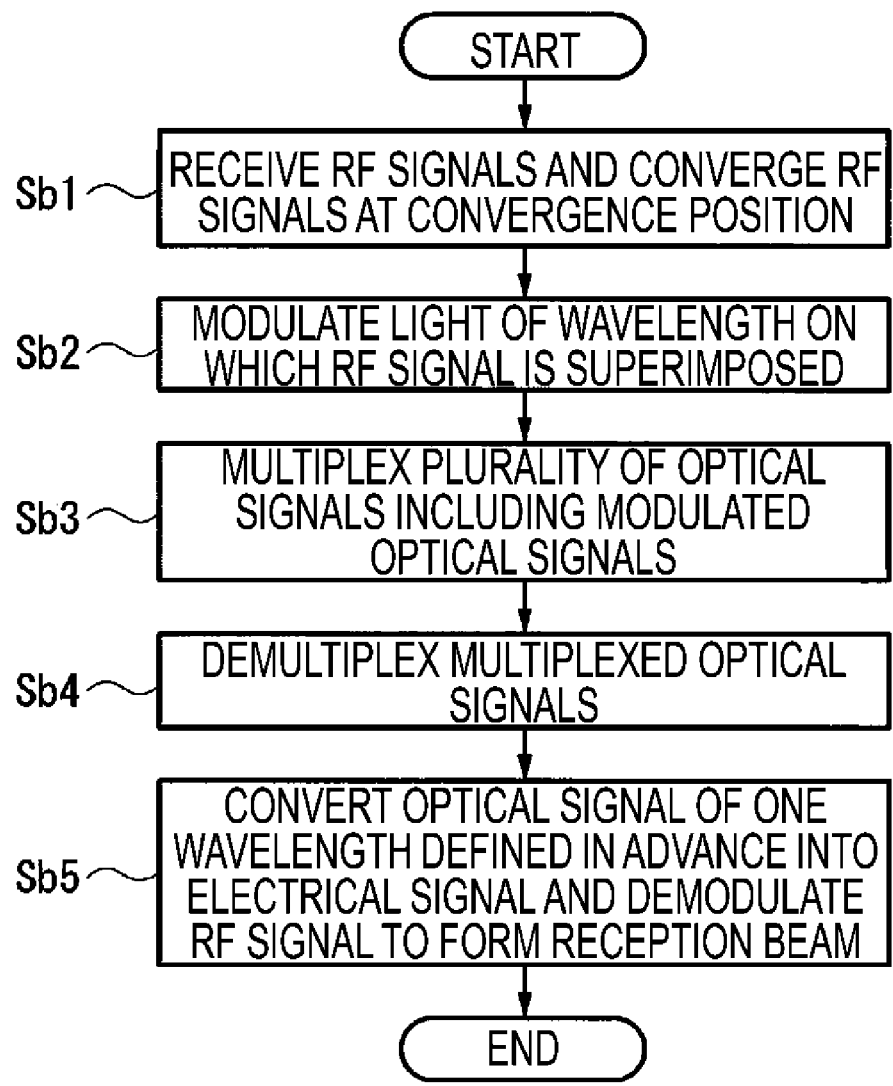
FIG. 11 is a flowchart illustrating a flow of processing performed by the wireless reception system according to the second embodiment.

Processing Performed by Wireless Reception System According to Second Embodiment FIG. 11 is a flowchart illustrating a flow of processing performed by the wireless reception system 90r1a according to the second embodiment. The following description will be given on the assumption that the accommodation station reception unit 40sa illustrated in FIG. 10, for example, is included as the accommodation station reception unit 40s.

It is assumed that an RF signal transmitted by the transmission terminal apparatus 9-2 has arrived from a direction of the reception beam 6-i. The arriving RF signal is reflected by the reflect array 31-1 and converges at the position of the reception antenna 32-i due to the aforementioned reversibility of the reflect array. The reception antenna 32-i receives the RF signal that has converged at the position of the reception antenna 32-i and outputs the RF signal to the optical modulator 33-i (Step Sb1).

At this time, the RF signal does not converge at the positions of the other reception antennas 32-1 to 32-(i−1) and 32-(i+1) to 32-n. Thus, the other reception antennas 32-1 to 32-(i−1) and 32-(i+1) to 32-n do not receive anything and thus do not output anything. The optical modulator 33-i performs intensity modulation with the RF signal output by the reception antenna 32-i to generate and output an optical signal, using the light of the wavelength $\lambda_{Ri}$ sent from the optical demultiplexer 36 as an optical carrier (Step Sb2).

The reception antenna 32-1 to 32-(i−1) and 32-(i+1) to 32-n connected thereto do not output anything. The optical modulators 33-1 to 33-(i−1) and 33-(i+1) to 33-n other than the optical modulator 33-i directly output the light of the wavelengths $\lambda_{R1}$ to $\lambda_{R(i+1)}$ and $\lambda_{R(i+1)}$ to $\lambda_{Rn}$ sent from the optical demultiplexer 36 to each of the optical modulators 33-1 to 33-(i−1) and 33-(i+1) to 33-n.

The optical multiplexer 34 multiplexes the optical signal of the wavelength $\lambda_{Ri}$ modulated with the RF signal output by the optical modulator 33-i and light of the wavelengths $\lambda_{R1}$ to $\lambda_{R(i−1)}$ and $\lambda_{R(i+1)}$ to $\lambda_{Rn}$ output by the optical modulators 33-1 to 33-(i−1) and 33-(i+1) to 33-n and output to the upstream optical fiber 3-2 (Step Sb3).

The upstream optical fiber 3-2 delivers the optical signal multiplexed by the optical multiplexer 34 to the optical demultiplexer 41 of the accommodation station reception unit 40sa. The optical demultiplexer 41 demultiplexes the optical signal obtained from the upstream optical fiber 3-2 into n wavelengths $\lambda_{R1}$ to $\lambda_{Rn}$. By the optical demultiplexer 41, each of the demultiplexed optical signals are branched and output to the output port of the corresponding wavelength (Step Sb4).

The reception wavelength control unit 43 outputs, to the n×1 optical switches 44, a control signal for connecting an input port of the n×1 optical switches 44 connected to the output port assigned to the wavelength $\lambda_{Ri}$ of the optical demultiplexer 41 to the output port of the n×1 optical switches 44. The n×1 optical switches 44 output the optical signal of the wavelength $\lambda_{Ti}$ from the output port by the n×1 optical switches 44 receiving the control signal and switching the switch.

The O/E converter 45 obtains the optical signal of the wavelength $\lambda_{Ri}$ output by the n×1 optical switches 44 from the output port, demodulates the RF signal by converting the obtained optical signal into an electrical signal, and outputs the demodulated RF signal (Step Sb5). This means that the RF signals arriving from the direction of the reception beam 6-$i$ is synthesized in-phase, such that the reception beam 6-$i$ is formed.

Figure 12:
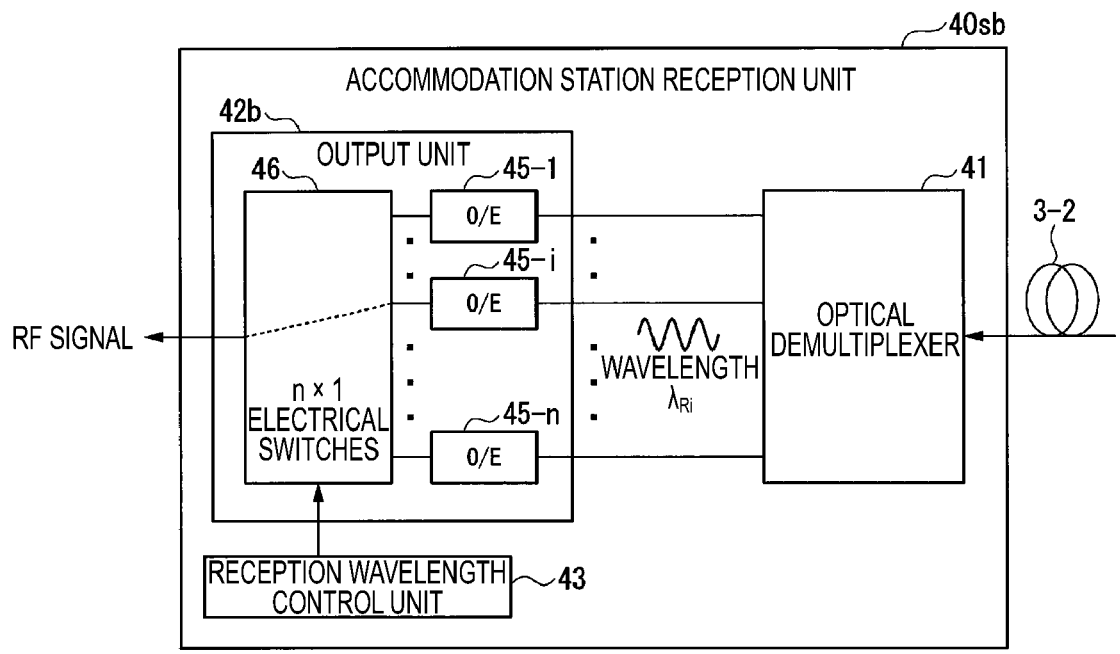
FIG. 12 is a block diagram illustrating an internal configuration of another configuration example of the accommodation station reception unit according to the second embodiment.

Another Configuration Example of Accommodation Station Reception Unit According to Second Embodiment Note that an accommodation station reception unit 40sb illustrated in FIG. 12 may be applied instead of the accommodation station reception unit 40sa illustrated in FIG. 10 as the accommodation station reception unit 40s. The accommodation station reception unit 40sb illustrated in FIG. 12 includes an optical demultiplexer 41, an output unit 42b, and a reception wavelength control unit 43. Note that the optical demultiplexer 41 illustrated in FIG. 12 has the same configuration as that of the optical demultiplexer 41 in FIG. 8, and the reception wavelength control unit 43 has the same configuration as that of the reception wavelength control unit 43 illustrated in FIG. 10.

The output unit 42b includes n O/E converters 45-1 to 45-$n$ and n×1 electrical switches 46. Each of the n O/E converters 45-1 to 45-$n$ is connected to the n output ports of the optical demultiplexer 41 and converts the optical signals of the wavelengths $\lambda_{R1}$ to $\lambda_{Rn}$ output from each of the n output ports of the optical demultiplexer 41 into electrical signals and outputs the electrical signals.

The n×1 electrical switches 46 include n input ports and one output port, and each of the n input ports is connected to each of the n O/E converters 45-1 to 45-$n$. The n×1 electrical switches 46 changes switches based on a control signal received from the reception wavelength control unit 43 and connects any one of the n input ports to the output port.

In other words, the accommodation station reception unit 40sa in FIG. 10 selects the wavelength $\lambda_{Ti}$ of the light that is an output target using the n×1 optical switches 44 first, and the O/E converter 45 converts the light into an electrical signal. On the other hand, the accommodation station reception unit 40sb in FIG. 12 has a configuration in which the n O/E converters 45-1 to 45-$n$ convert optical signals into electrical signals first and the wavelength $\lambda_{Ri}$ of the light that is an output target is then selected by the n×1 electrical switches 46. Thus, in the accommodation station reception unit 40sb as with the accommodation station reception unit 40sa, when the reception wavelength control unit 43 switches the output port of the connecting destination of the input port of the n×1 electrical switches 46 using the control signal, the wavelength $\lambda_{Ti}$ of the light on which the RF signal that is an output target is superimposed is switched.

In a case in which the accommodation station reception unit 40sb is applied and an RF signal arrives from the direction of the reception beam 6-$i$, the reception wavelength control unit 43 of the accommodation station reception unit 40sb outputs, to the n×1 electrical switches 46, a control signal for connecting the input port that obtains the electrical signal output by the O/E converter 45-$i$ to the output port in Step Sb5 in FIG. 11.

Second Embodiment: Reception Side in Single Mode "Application Example of Transmit Array"

Figure 13:
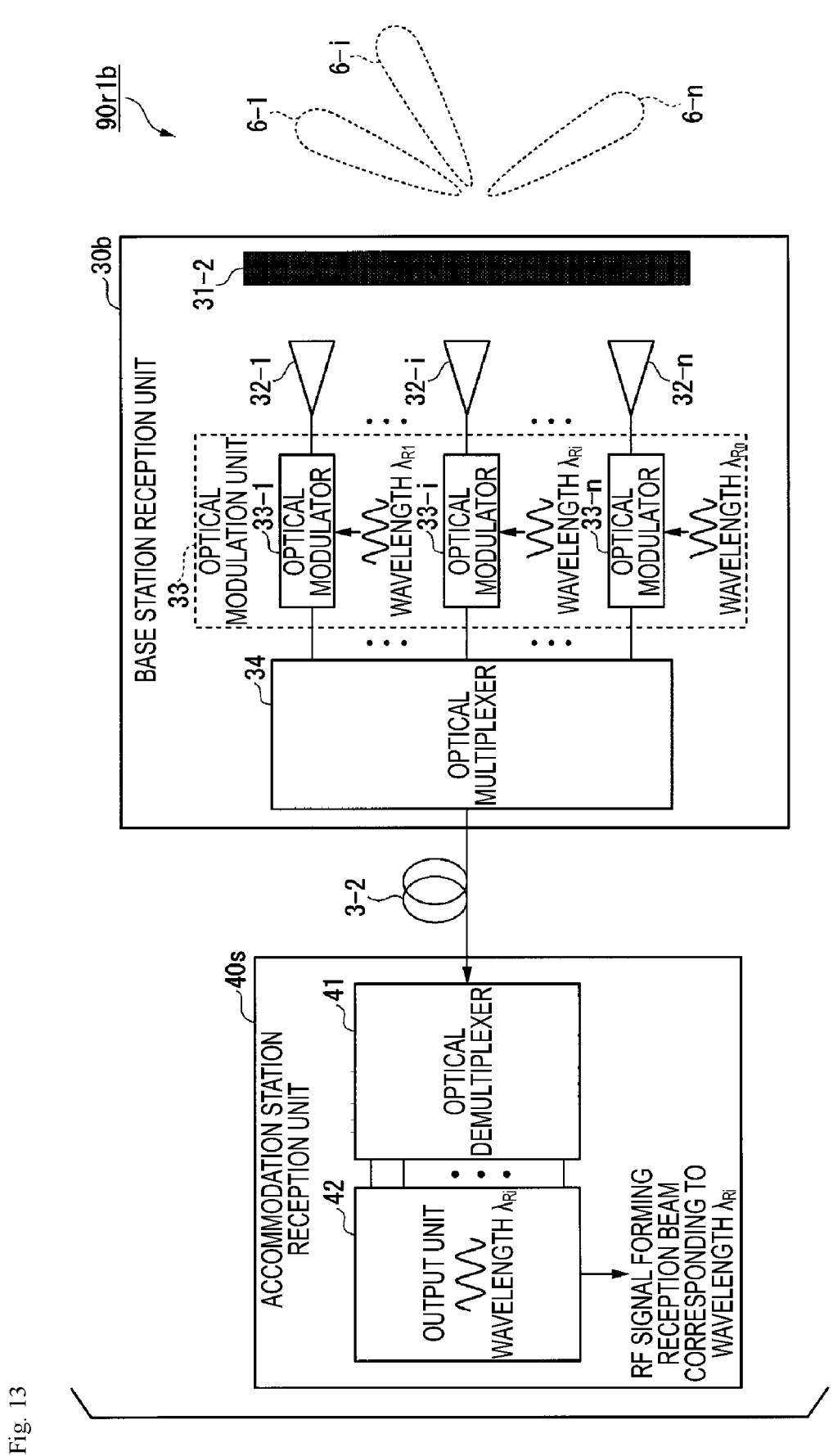
FIG. 13 is a block diagram illustrating another configuration example of the wireless reception system according to the second embodiment.

FIG. 13 is a block diagram illustrating a configuration of a wireless reception system 90r1b which is another configuration example of the second embodiment. In FIG. 13, the same reference signs will be applied to the same configurations as those in FIG. 8, and different configurations will be described below.

The wireless reception system 90r1b includes an accommodation station reception unit 40s, a base station reception unit 30b, an upstream optical fiber 3-2, and a transmission terminal apparatus 9-2 illustrated in FIG. 2, although not illustrate in FIG. 13.

The base station reception unit 30b includes a transmit array 31-2 that is a reception beam formation unit configured to converge received RF signals, n reception antennas 32-1 to 32-$n$, an optical modulation unit 33, and an optical multiplexer 34. The transmit array 31-2 has the same configuration as that of the transmit array 24-2 according to the first embodiment, and these transmit arrays have reversibility.

As described above with reference to FIG. 7, if a radio wave of an RF signal is emitted from a transmission antenna 23-$i$, for example, the radio wave of the RF signal passes through the transmit array 24-2. When the radio wave of the RF signal passes through the transmit array 24-2, the radio wave of the RF signal is strengthened in the same phase in a specific direction in accordance with the position of the transmission antenna 23-$i$, and the transmission beam 5-$i$ is formed.

For example, it is assumed that an RF signal of the same frequency as that of the RF signal with which the transmission beam 5-$i$ is formed has arrived from the traveling direction of the transmission beam 5-$i$. The reversibility of the transmit array means that when the RF signal arriving from the direction of the transmission beam 5-$i$ passes through the transmit array 24-2, the RF signal converges at the position of the transmission antenna 23-$i$. Thus, for example, when the reception antenna 32-$i$ is placed at the position of the transmission antenna 23-$i$, the reception antenna 32-$i$ synthesizes the RF signal arriving from the direction of the transmission beam 5-$i$ in phase and receive the RF signal. It is thus possible to form a reception beam 6-$i$ by selecting the RF signal to be received by the reception antenna 32-$i$. Thus, the transmit array 31-2 and the n reception antennas 32-1 to 32-$n$ illustrated in FIG. 13 are disposed in a positional relationship in accordance with arriving directions of the reception beams 6-1 to 6-$n$ such that the reception beams 6-1 to 6-$n$ arriving from mutually different directions can be received.

Processing in Another Configuration Example of Second Embodiment

Processing performed by the wireless reception system 90r1b includes the following processing in Step Sb1 of the flowchart illustrated in FIG. 11. In other words, it is assumed that an RF signal transmitted by the transmission terminal apparatus 9-2 has arrived from the direction of the reception beam 6-$i$. The arriving RF signal passes through the transmit array 31-2 and converges at the position of the reception antenna 32-$i$ due to the aforementioned reversibility of the transmit array. The reception antenna 32-$i$ receives the RF signal that has converged at the position of the reception antenna 32-$i$ and outputs the RF signal to the optical modulator 33-$i$. The same processing as that of the wireless reception system 90$r$1$a$ is performed in Steps Sb2 to Sb5.

Note that, as the accommodation station reception unit 40$s$ included in the wireless reception system 90$r$1$b$, as with the wireless reception system 90$r$1$a$, the accommodation station reception unit 40$sa$ illustrated in FIG. 10 may be applied or the accommodation station reception unit 40$sb$ illustrated in FIG. 12 may be applied.

Note that, in the aforementioned wireless reception systems 90$r$1$a$ and 90$r$1$b$, in a case in which an RF signal arrives from a direction other than the directions of the reception beams 6-1 to 6-$m$, RF signals with different amplitudes and different phases from those of the original RF signal arrives at the positions of the plurality of reception antennas 32-1 to 32-$n$. Thus, each of the reception antennas 32-1 to 32-$n$ output an RF signal with a different amplitude and a different phase from those of the original RF signal.

In this case, the RF signals with the different amplitudes and the different phases are sent the optical modulators 33-1 to 33-$n$. Each of the optical modulators 33-1 to 33-$n$ generates optical signals of the wavelengths $\lambda_{T1}$ to $\lambda_{Tn}$ modulated with the RF signal sent to each of the optical modulators 33-1 to 33-$n$. From a different viewpoint, a state in which RF signals are separately superimposed on the optical signals of the plurality of wavelengths $\lambda_{T1}$ to $\lambda_{Tn}$ is achieved. Thus, the output unit 42 of the accommodation station reception unit 40$s$ is required to perform processing of demodulating the RF signals by targeting the plurality of optical signals output by the optical demultiplexer 41 from the plurality of output ports. For example, the output unit 42 of the accommodation station reception unit 40$s$ performs electrical conversion on each of the optical signals demultiplexed and output by the optical demultiplexer 41 for each wavelength and demodulates the RF signal superimposed on each of the optical signals. The output unit 42 may select and output an RF signal with the highest power from among the demodulated RF signals or may adjust the amplitudes and phases of the plurality of demodulated RF signals, perform maximum ratio synthesis, and output the result, for example.

In the wireless reception systems 90$r$1$a$ and 90$r$2$b$ according to the second embodiment, the base station reception units 30$a$ and 30$b$ include the reflect array 31-1 or the transmit array 31-2, the reception antennas 32-1 to 32-$n$, the optical modulators 33-1 to 33-$n$, and the optical multiplexer 34. Further, the reflect array 31-1 or the transmit array 31-2 receives an RF signal with the reception beam 6-$i$ and converges the RF signal at the convergence position in accordance with the reception beam 6-$i$. The reception antenna 32-$i$ receives the RF signal that has converged at the convergence position. The optical modulators 33-1 to 33-$n$ are connected to the reception antennas 32-1 to 32-$n$, and light of different wavelengths $\lambda_{T1}$ to $\lambda_{Tn}$ is given to each of the optical modulators 33-1 to 33-$n$. Then, the optical modulator 33-$i$ modulates the light of the given wavelength $\lambda_{Ti}$ and generates an optical signal based on the RF signal received by the connected reception antenna 32-$i$. The optical multiplexer 34 multiplexes the optical signals of the mutually different wavelengths generated by the optical modulators 33-1 to 33-$n$ and outputs the multiplexed optical signal. The accommodation station reception unit 40$s$ includes an optical demultiplexer 41 and an output unit 42, and the optical demultiplexer 41 obtains the optical signals output by the optical multiplexer 34 and demultiplexes the optical signals depending on wavelengths. The output unit 42 demodulates the RF signal by converting the optical signal of the wavelength $\lambda_{Ti}$ included in the optical signal output by the optical demultiplexer 41 into an electrical signal and outputs the demodulated RF signal.

It is assumed that in the aforementioned wireless reception systems 90$r$1$a$ and 90$r$1$b$, the transmission terminal apparatus 9-2 that transmits a radio wave of an RF signal serves as another transmission terminal apparatus 9-2 and a reception beam 6-$j$ arrives from a direction that is different from that of the reception beam 6-$i$ (here, j is any value from 1 to n and it is assumed that i≠j). In this case, the accommodation station reception unit 40$s$ can obtain the RF signal that forms the reception beam 6-$j$ by selecting the wavelength $\lambda_{Rj}$. It is assumed that an RF signal has arrived from a direction of the reception beam 6-$j$ that is different from the reception beam 6-$i$ (here, j is any value from 1 to n, and it is assumed that i≠j). In this case, the accommodation station reception unit 40$s$ can obtain the RF signal with the reception beam 6-$j$ by selecting the wavelength $\lambda_{Rj}$. The desired RF signal can be obtained merely by selecting any of the wavelengths $\lambda_{T1}$ to $\lambda_{Tn}$ in this manner. This is because each of the n wavelengths $\lambda_{T1}$ to $\lambda_{Tn}$ and each of then reception antennas 32-1 to 32-$n$ are correlated in a fixed manner by the optical multiplexer 34 and the optical demultiplexer 41. In other words, it is possible to state that each of the n wavelengths $\lambda_{T1}$ to $\lambda_{Tn}$ and each of the n reception beams 6-1 to 6-$n$ are correlated in a one-to-one relationship. Thus, the accommodation station reception unit 40$s$ can switch the reception beams 6-1 to 6-$n$ merely by switching the wavelengths $\lambda_{R1}$ to $\lambda_{Rn}$.

The aforementioned wireless reception systems 90$r$1$a$ and 90$r$1$b$ perform only control of selecting the wavelength $\lambda_{Ti}$ of the optical signal on which the RF signal demodulated by the accommodation station reception unit 40$s$ of the accommodation station apparatus 2 is superimposed, and it is not necessary for the base station apparatus 1 to perform any control at all. Moreover, the information regarding the distance of the upstream optical fiber 3-2 is also not needed, and the number of wavelengths used is limited to the number of reception antennas 32-1 to 32-$n$.

In a case in which an RoF reception configuration is realized using the technique described in NPL 2, a certain feed 501-$i$ is selected from a plurality of feeds 501-1 to 501-$n$ illustrated in FIGS. 26 and 27 to receive a radio wave of an RF signal. In this case, 1×n switches configured to perform electrical switching are used, for example, and each of the n feeds 501-1 to 501-$n$ is connected to each of n input ports of the 1×n switches. A loss occurs when the RF signal passes through the 1×n switches, and there is typically a problem that the loss increases as the value of n increases.

On the other hand, in the wireless reception systems 90$r$1$a$ and 90$r$1$b$, in the case of the accommodation station reception unit 40$sa$ illustrated in FIG. 10, the reception antenna 32-$i$ that receives an RF signal is selected through processing of switching the n×1 optical switches 44 that optically switches. Thus, it is possible to perform the switching with a lower loss as compared with the processing of electrically switching the reception antenna 32-$i$ configured to receive the RF signal.

Further, in the case of the accommodation station reception unit 40$sb$ illustrated in FIG. 12, the reception antenna 32-$i$ that receives an RF signal is selected through processing of switching the n×1 electrical switches 46.

Third Embodiment: Transmission Side in Multi Mode "Application Example of Reflect Array"

Figure 14:
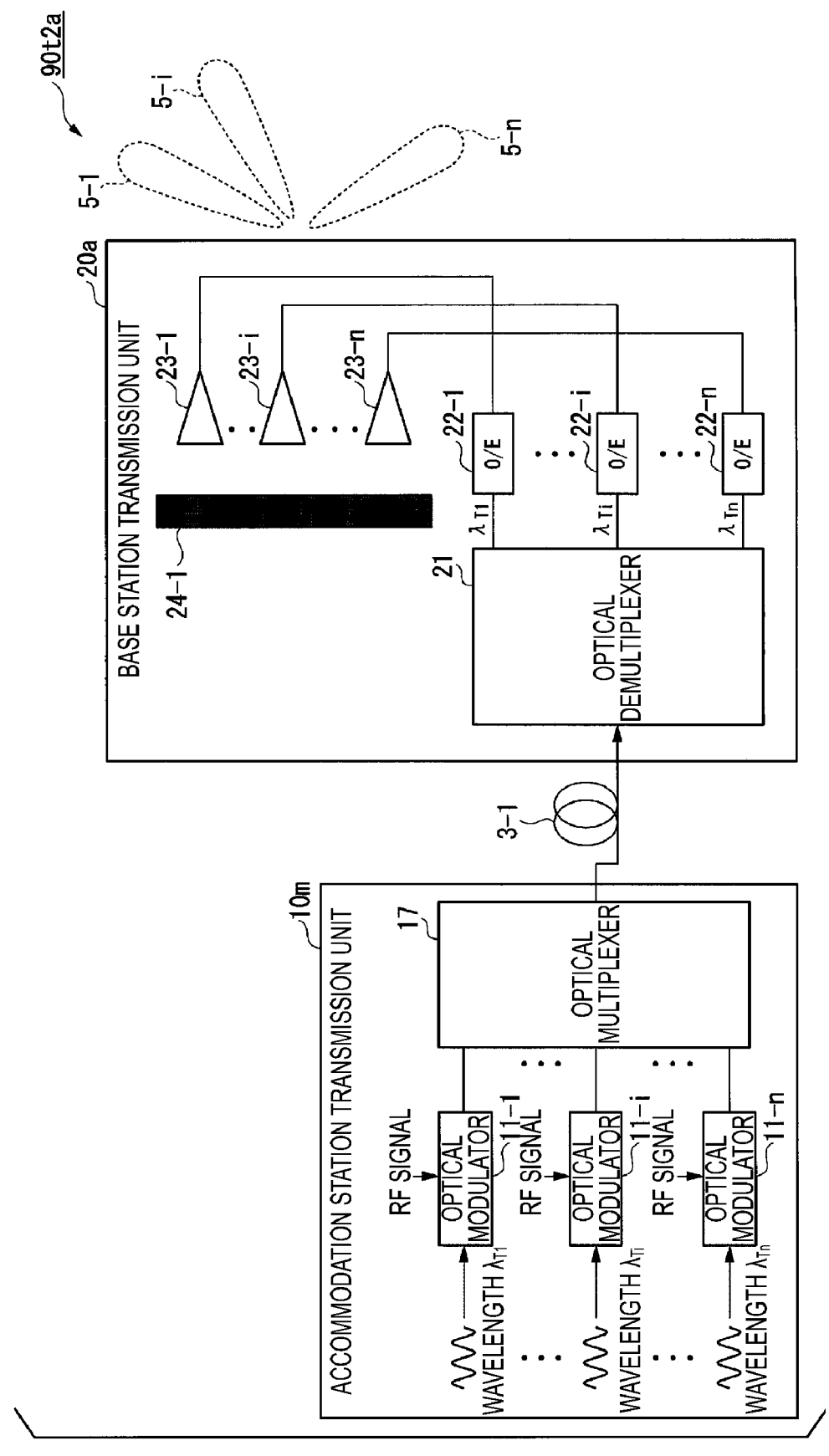
FIG. 14 is a block diagram illustrating a configuration of a wireless transmission system according to a third embodiment.

FIG. 14 is a block diagram illustrating a configuration of a wireless transmission system 90$t$2$a$ according to a third embodiment. In FIG. 14, the same reference signs will be applied to the same configurations as those in FIG. 3, and different configurations will be described below. The wireless transmission system 90t2a includes an accommodation station transmission unit 10m, a base station transmission unit 20a, a downstream optical fiber 3-1, and a reception terminal apparatus 9-1 illustrated in FIG. 2, although not illustrated in FIG. 14. Here, it is assumed that n reception terminal apparatuses 9-1 are provided and are represented as reception terminal apparatuses 9-1-1 to 9-1-n.

Figure 15:
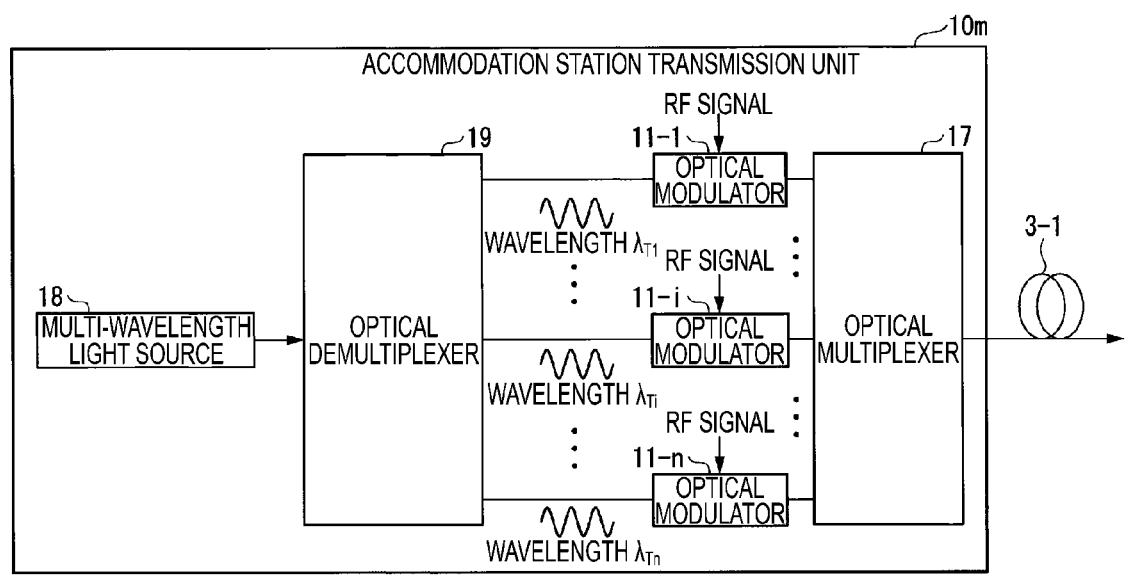
FIG. 15 is a block diagram illustrating an internal configuration of an accommodation station transmission unit according to the third embodiment.

The accommodation station transmission unit 10m has an internal configuration illustrated in FIG. 15. The accommodation station transmission unit 10m includes a multiple-wavelength light source 18, an optical demultiplexer 19, n optical modulators 11-1 to 11-n, and an optical multiplexer 17. The multiple-wavelength light source 18 generates and outputs light of the wavelengths $\lambda_{T1}$ to $\lambda_{Tn}$. The optical demultiplexer 19 includes one input port and n output ports, and each of the n output ports is assigned to each of the n wavelengths $\lambda_{T1}$ to $\lambda_{Tn}$ in a fixed manner. The optical demultiplexer 19 demultiplexes the light of the wavelengths $\lambda_{T1}$ to $\lambda_{Tn}$ output by the multiple-wavelength light source 18 for each wavelength, and the demultiplexed light is branched and output to the output ports of the corresponding wavelengths.

Each of the optical modulators 11-1 to 11-n is connected to n output ports of the optical demultiplexer 19. Each of the optical modulators 11-1 to 11-n obtains an RF signal for a different transmission destination, for example. Each of the optical modulators 11-1 to 11-n obtains the light of the wavelengths $\lambda_{T1}$ to $\lambda_{Tn}$ output from the output port of the optical demultiplexer 19 connected to each of the optical modulators 11-1 to 11-n. Each of the optical modulators 11-1 to 11-n performs intensity modulation with the RF signal obtained by each of the optical modulators 11-1 to 11-n using the obtained light as an optical carrier to generate an optical signal and outputs the generated optical signal. The optical multiplexer 17 multiplexes the n optical signals generated by the optical modulators 11-1 to 11-n and outputs the multiplexed optical signal to the downstream optical fiber 3-1.

Figure 16:
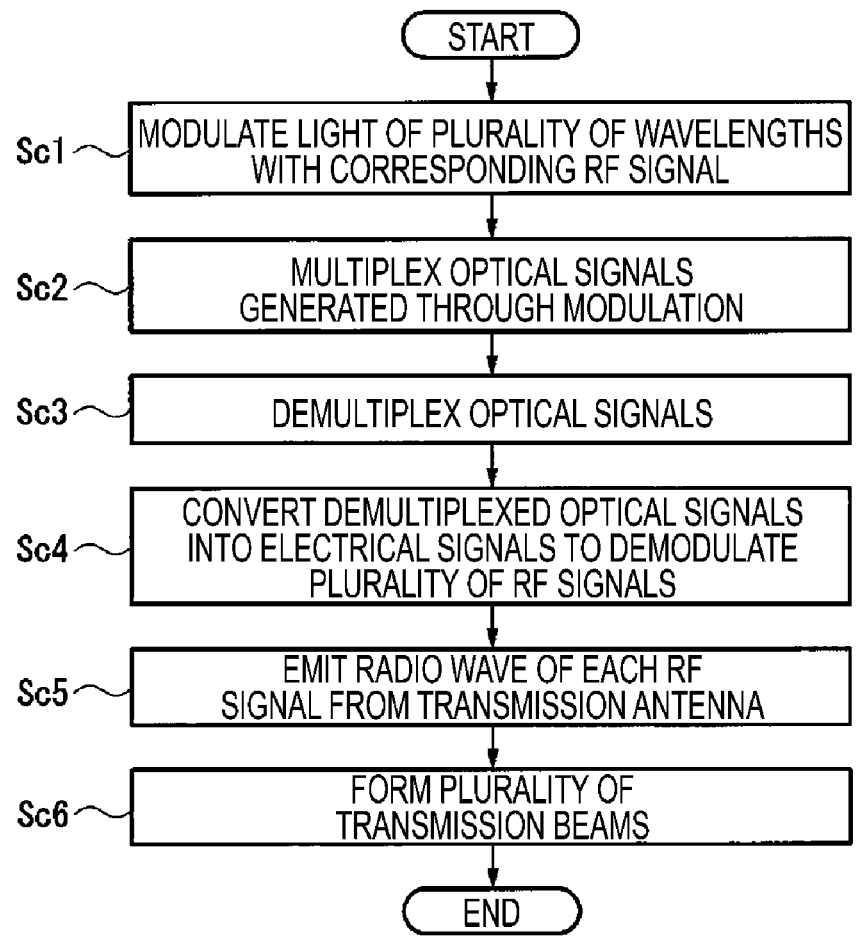
FIG. 16 is a flowchart illustrating a flow of processing performed by the wireless transmission system according to the third embodiment.

Processing Performed by Wireless Transmission System According to Third Embodiment FIG. 16 is a flowchart illustrating a flow of processing performed by a wireless transmission system 90t2a according to the third embodiment. The multiple-wavelength light source 18 of the accommodation station transmission unit 10m generates and outputs the light of the wavelengths $\lambda_{T1}$ to $\lambda_{Tn}$. The optical demultiplexer 19 demultiplexes the light of the wavelengths $\lambda_{T1}$ to $\lambda_{Tn}$ output by the multiple-wavelength light source 18 for each wavelength and branches and outputs the demultiplexed light to the output ports of the corresponding wavelengths.

Each of the optical modulators 11-1 to 11-n uses, as an optical carrier, light of the wavelengths $\lambda_{T1}$ to $\lambda_{Tn}$ output from the output ports by the optical demultiplexer 19 connected to each of the optical modulators 11-1 to 11-n, and performs intensity modulation with RF signals of different transmission destinations obtained by each of the optical modulators 11-1 to 11-n to generate optical signals. The optical modulators 11-1 to 11-n outputs the generated optical signals to the optical multiplexer 17 (Step Sc1).

The optical multiplexer 17 multiplexes n optical signals output by the optical modulators 11-1 to 11-n and outputs the multiplexed optical signal to the downstream optical fiber 3-1 (Step Sc2). The downstream optical fiber 3-1 delivers the optical signal output by the optical multiplexer 17 to the optical demultiplexer 21 of the base station transmission unit 20a. The optical demultiplexer 21 demultiplexes the optical signal obtained from the downstream optical fiber 3-1 into the n wavelengths $\lambda_{T1}$ to $\lambda_{Tn}$. Each of the demultiplexed optical signals is branched by the optical demultiplexer 21 to the output port corresponding to each wavelength and outputs to the O/E converters 22-1 to 22-n connected to the output ports (Step Sc3).

Each of the O/E converters 22-1 to 22-n converts each of the optical signals of the wavelengths $\lambda_{T1}$ to $\lambda_{Tn}$ branched and output by the optical demultiplexer 21 into an electrical signal and demodulates the RF signal (Step Sc4). Each of the O/E converters 22-1 to 22-n outputs the demodulated RF signal to the transmission antennas 22-1 to 22-n connected to each of the O/E converters 22-1 to 22-n. Each of the transmission antennas 23-1 to 23-n emits radio waves of the RF signals output by each of the O/E converters 22-1 to 22-n (Step Sc5). When the radio waves of the RF signals emitted by each of the transmission antennas 23-1 to 23-n are reflected by the reflect array 24-1, the transmission beams 5-1 to 5-n are formed in mutually different directions which are directions in accordance with each of the positions of the transmission antennas 23-1 to 23-n. In other words, multi-beams including the n transmission beams 5-1 to 5-n are formed (Step Sc6).

Each of then reception terminal apparatuses 9-1-1 to 9-1-n receives the RF signals transmitted with the transmission beams 5-1 to 5-n and demodulates and obtains the RF signals.

Third Embodiment: Transmission Side in Multi Mode "Application Example of Transmit Array"

Figure 17:
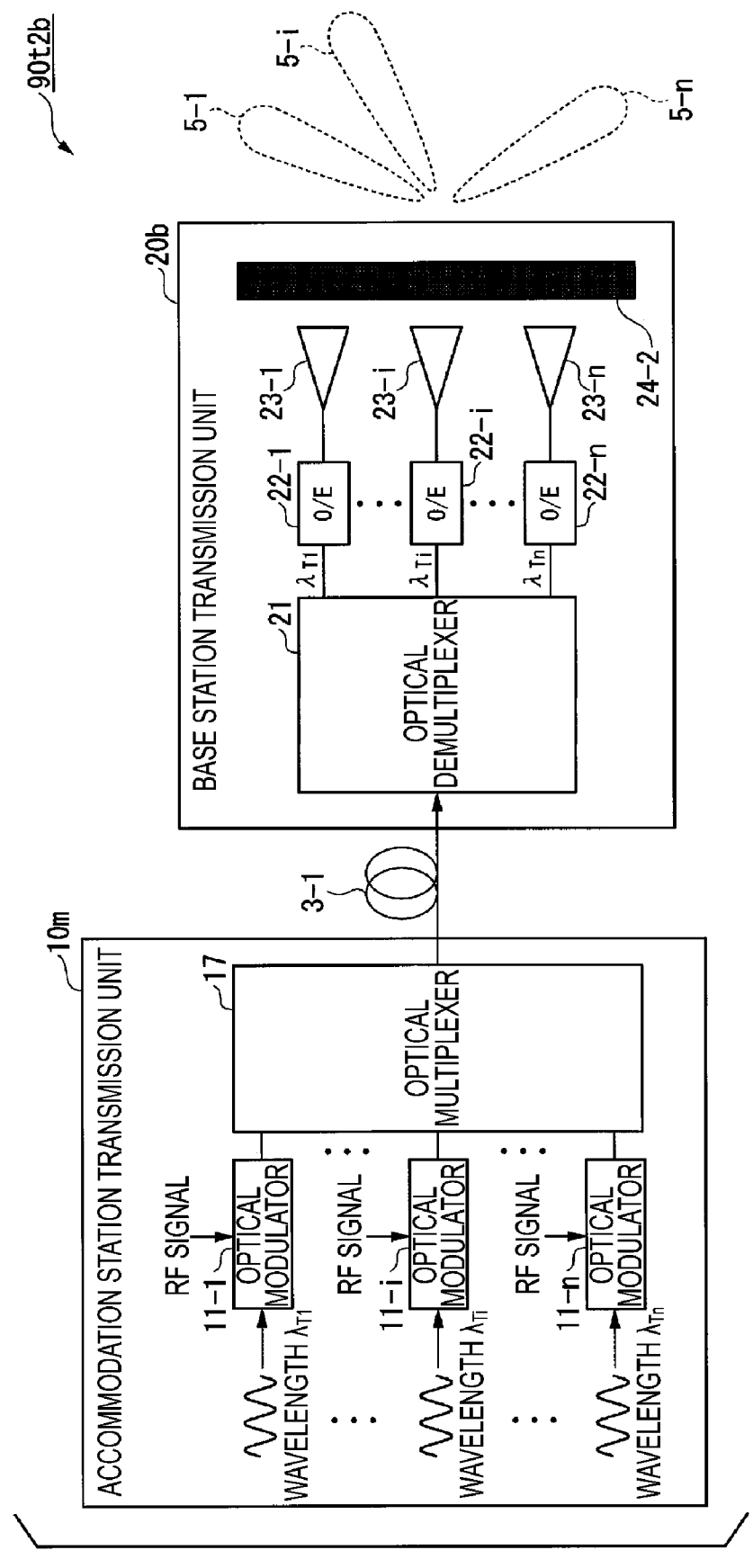
FIG. 17 is a block diagram illustrating another configuration example of the wireless transmission system according to the third embodiment.

FIG. 17 is a block diagram illustrating a configuration of a wireless transmission system 90t2b that is another configuration example of the second embodiment. In FIG. 17, the same reference signs will be applied to the same configurations as those in FIGS. 7 and 14, and different configurations will be described below. The wireless transmission system 90t2b includes an accommodation station transmission unit 10m, a base station transmission unit 20b, a downstream optical fiber 3-1, and a reception terminal apparatus 9-1 illustrated in FIG. 2, although not illustrated in FIG. 17. Here, it is assumed that n reception terminal apparatuses 9-1 are provided and are represented as reception terminal apparatuses 9-1-1 to 9-1-n.

In other words, the wireless transmission system 90t2b has a configuration in which an accommodation station transmission unit 10m of the wireless transmission system 90t2a according to the third embodiment and the base station transmission unit 20b of the wireless transmission system 90t1b, which is another configuration example of the first embodiment, are connected with the downstream optical fiber 3-1.

Processing in Another Configuration Example of Third Embodiment

As processing performed by the wireless transmission system 90t2b, the same processing as that of the wireless transmission system 90t2a is performed in Steps Sc1 to Sc5 in the flowchart illustrated in FIG. 16.

In Step Sc6, when the radio waves of the RF signals emitted by each of the transmission antennas 23-1 to 23-n passes through the transmit array 24-2, the transmission beams 5-1 to 5-n are formed in specific directions that are different in accordance with each of the positions of the transmission antennas 23-1 to 23-n. In other words, multi-beams including the n transmission beams 5-1 to 5-n are formed. Each of the n reception terminal apparatuses 9-1-1 to 9-1-$n$ receives the RF signal transmitted with the transmission beams 5-1 to 5-$n$ and demodulates and obtains the RF signal.

In the wireless communication systems 90$t$2$a$ and 90$t$2$b$ according to the third embodiment, the accommodation station transmission unit 10$m$ includes the optical modulators 11-1 to 11-$n$ and the optical multiplexer 17, and light of mutually different wavelengths $\lambda_{T1}$ to $\lambda_{Tn}$ is given to each of the optical modulators 11-1 to 11-$n$. Each of the optical modulators 11-1 to 11-$n$ modulates the light given to each of the optical modulators 11-1 to 11-$n$ to generate optical signals based on the RF signal, and the optical multiplexer 17 multiplexes and outputs the optical signals generated by the optical modulators 11-1 to 11-$n$. The base station transmission units 20$a$ and 20$b$ include an optical demultiplexer 21, O/E converters 22-1 to 22-$n$, transmission antennas 23-1 to 23-$n$, and a reflect array 24-1 or a transmit array 24-2. The optical demultiplexer 21 includes a plurality of output ports allocated for each wavelength of the light, obtains the optical signal output by the accommodation station transmission unit 10$m$ from the input port, demultiplexes the obtained optical signal for each wavelength, and outputs the demultiplexed optical signals from the output ports of the corresponding wavelengths. Each of the O/E converters 22-1 to 22-$n$ is connected to the plurality of output ports of the optical demultiplexer 21, converts the optical signals output by the optical demultiplexer 21 into electrical signals to demodulate the RF signals, and outputs the demodulated RF signals. The transmission antennas 23-1 to 23-$n$ are connected to each of the O/E converters 22-1 to 22-$n$ and emit the RF signal output by each of the O/E converters 22-1 to 22-$n$. The reflect array 24-1 or the transmit array 24-2 receives the RF signal emitted by each of the transmission antennas 23-1 to 23-$n$ and forms, for each of the received RF signals, the transmission beams 5-1 to 5-$n$ in different directions for each of the positions of the transmission antennas 23-1 to 23-$n$ that are transmission sources of the RF signals.

In the aforementioned wireless transmission systems 90$t$2$a$ and 90$t$2$b$, each of the n wavelengths $\lambda_{T1}$ to $\lambda_{Tn}$ and each of the transmission antennas 23-1 to 23-$n$ are correlated in a fixed manner by the optical multiplexer 17 and the optical demultiplexer 21. In other words, it is possible to state that each of the n wavelengths $\lambda_{T1}$ to $\lambda_{Tn}$ and each of the n transmission beams 5-1 to 5-$n$ are correlated in a one-to-one relationship. Thus, it is possible to form multi beams, that is, the n transmission beams 5-1 to 5-$n$ by the accommodation station transmission unit 10$m$ performing modulation with the n RF signals using the light of the n wavelengths $\lambda_{T1}$ to $\lambda_{Tn}$ as an optical carrier and generating the n optical signals.

The aforementioned wireless transmission systems 90$t$2$a$ and 90$t$2$b$ do not need any control of the base station apparatus 1 at all. Further, information regarding the distance of the downstream optical fiber 3-1 is not needed, and the number of wavelengths used is limited to the number of transmission antennas 23-1 to 23-$n$. Further, a configuration for electrically switching switches is also not included. It is thus possible to perform beamforming for transmission/reception antennas without using control of the base station apparatus and information regarding the distance of the optical fiber while curbing degradation of wavelength utilization efficiency and an increase in cost.

Fourth Embodiment: Reception Side in Multi Mode "Application Example of Reflect Array"

Figure 18:
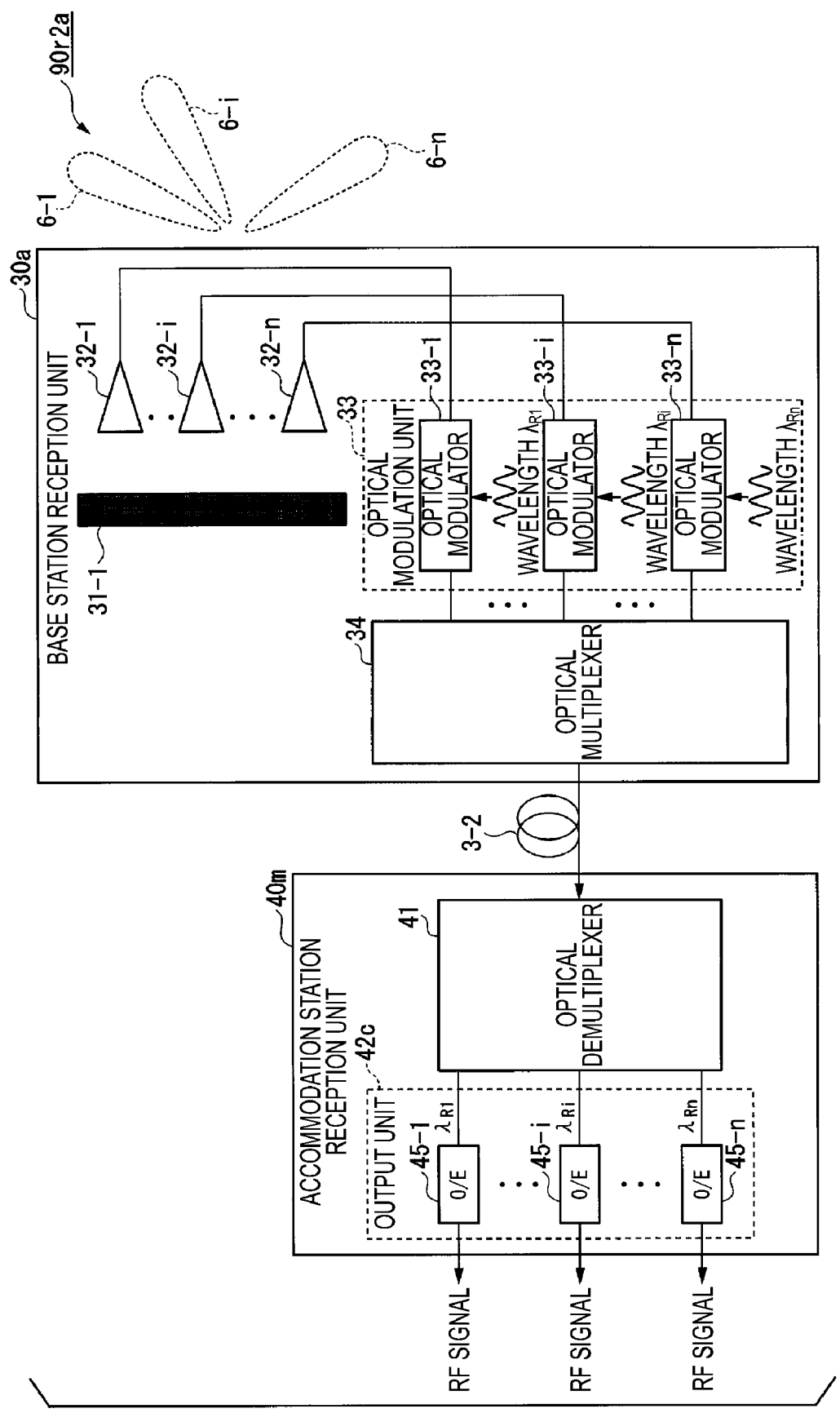
FIG. 18 is a block diagram illustrating a configuration of a wireless reception system according to a fourth embodiment.

FIG. 18 is a block diagram illustrating a configuration of a wireless reception system 90$r$2$a$ according to the fourth embodiment. In FIG. 18, the same reference signs will be applied to the same configurations as those in FIG. 8, and different configurations will be described below.

The wireless reception system 90$r$2$a$ includes an accommodation station reception unit 40$m$, a base station reception unit 30$a$, an upstream optical fiber 3-2, and a transmission terminal apparatus 9-2 illustrated in FIG. 2, although not illustrated in FIG. 18. Here, it is assumed that n transmission terminal apparatuses 9-2 are provided and are represented as transmission terminal apparatus 9-2-1 to 9-2-$n$.

The accommodation station reception unit 40$m$ includes an optical demultiplexer 41 and an output unit 42$c$, and the output unit 42$c$ includes n O/E converters 45-1 to 45-$n$. Each of the n O/E converters 45-1 to 45-$n$ is connected to each of the n output ports of the optical demultiplexer 41. The optical demultiplexer 41 demultiplexes the optical signals of the n wavelengths $\lambda_{R1}$ to $\lambda_{Rn}$ delivered through the upstream optical fiber 3-2, and each of the demultiplexed optical signals are branched and output to the output ports of the corresponding wavelengths. Each of the n O/E converters 45-1 to 45-$n$ obtains the optical signal output by the optical demultiplexer 41 from each of the n output ports, converts the obtained optical signal into an electrical signal, and demodulates and outputs the RF signal.

Figure 19:
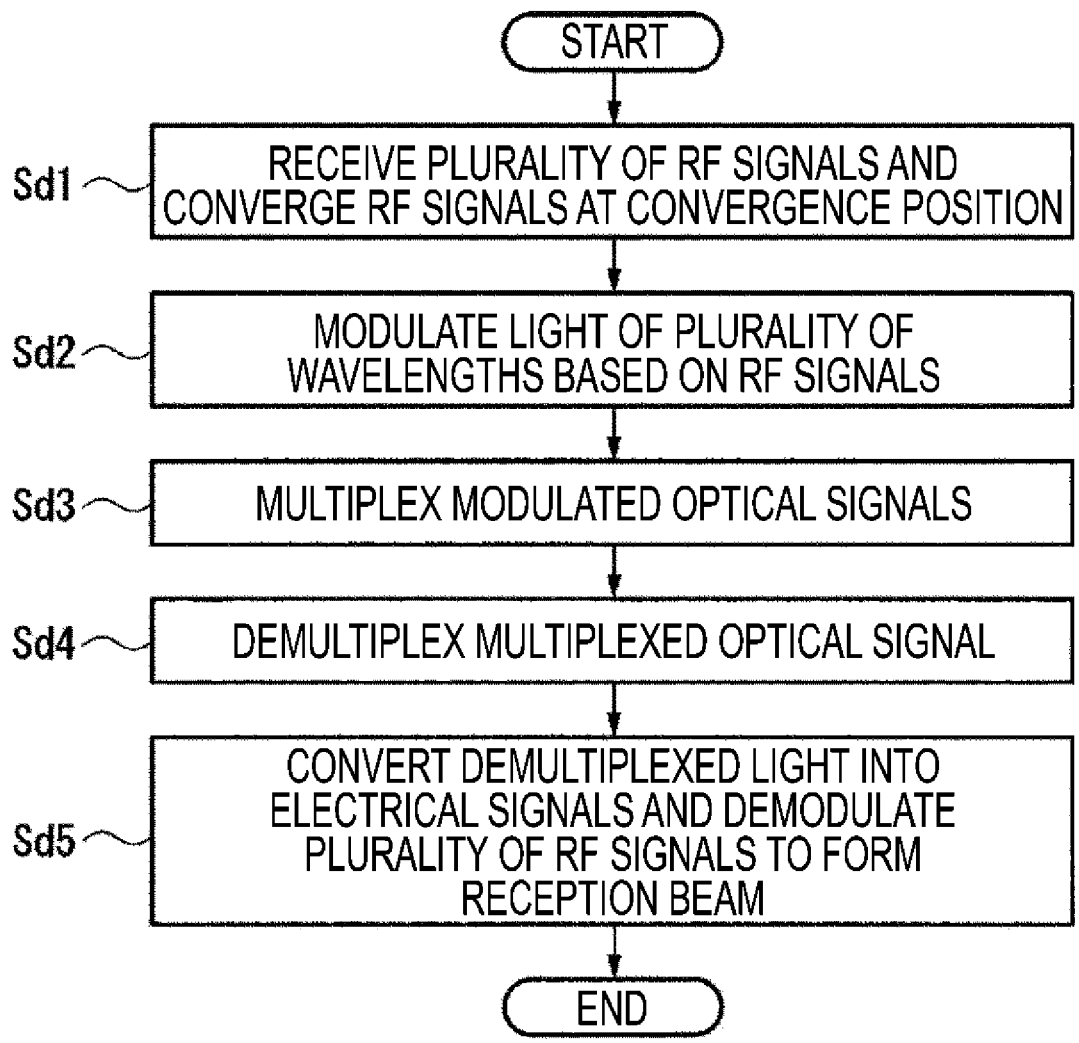
FIG. 19 is a flowchart illustrating a flow of processing performed by the wireless reception system according to the fourth embodiment.

Processing Performed by Wireless Reception System According to Fourth Embodiment FIG. 19 is a flowchart illustrating a flow of processing performed by a wireless reception system 90$r$2$a$ according to the fourth embodiment.

It is assumed that the RF signals transmitted by each of the n transmission terminal apparatuses 9-2-1 to 9-2-$n$ have arrived from the directions of the n reception beams 6-1 to 6-$n$. The arriving RF signals are reflected by the reflect array 31-1 and converge at the positions of the reception antennas 32-1 to 32-$n$ due to the aforementioned reversibility of the reflect array. Each of the reception antennas 32-1 to 32-$n$ receives the RF signals that have converged at each position and outputs the RF signals to the optical modulators 33-1 to 33-$n$ connected to each of the reception antennas 32-1 to 32-$n$ (Step Sd1).

Each of the optical modulators 33-1 to 33-$n$ performs intensity modulation with the RF signals output by the reception antennas 32-1 to 32-$n$ using the light of the wavelengths $\lambda_{R1}$ to $\lambda_{Rn}$ given from the optical demultiplexer 36 to each of the optical modulators 33-1 to 33-$n$ as an optical carrier to generate and output optical signals (Step Sd2).

The optical multiplexer 34 multiplexes the n optical signals of the wavelengths $\lambda_{R1}$ to $\lambda_{Rn}$ output by each of the optical modulators 33-1 to 33-$n$ and outputs the multiplexed optical signal to the upstream optical fiber 3-2 (Step Sd3). The upstream optical fiber 3-2 delivers the optical signal multiplexed by the optical multiplexer 34 to the optical demultiplexer 41 of the accommodation station reception unit 40$m$.

The optical demultiplexer 41 demultiplexes the optical signal obtained from the upstream optical fiber 3-2 into n wavelengths $\lambda_{R1}$ to $\lambda_{Rn}$. The optical demultiplexer 41 branches and outputs each of the demultiplexed optical signals to the output ports of the corresponding wavelengths (Step Sd4).

Each of the n O/E converters 45-1 to 45-$n$ of the output unit 42$c$ obtains the optical signal output by the optical demultiplexer 41 from each of the output ports, converts the obtained optical signal into an electrical signal, and demodulates and outputs the RF signal. This means that the RF signals arriving from directions of the reception beams 6-1 to 6-$m$ are synthesized in-phase, such that the reception beams 6-1 to 6-$m$ are formed (Step Sd5).

Fourth Embodiment: Reception Side in Multi Mode "Application Example of Transmit Array"

Figure 20:
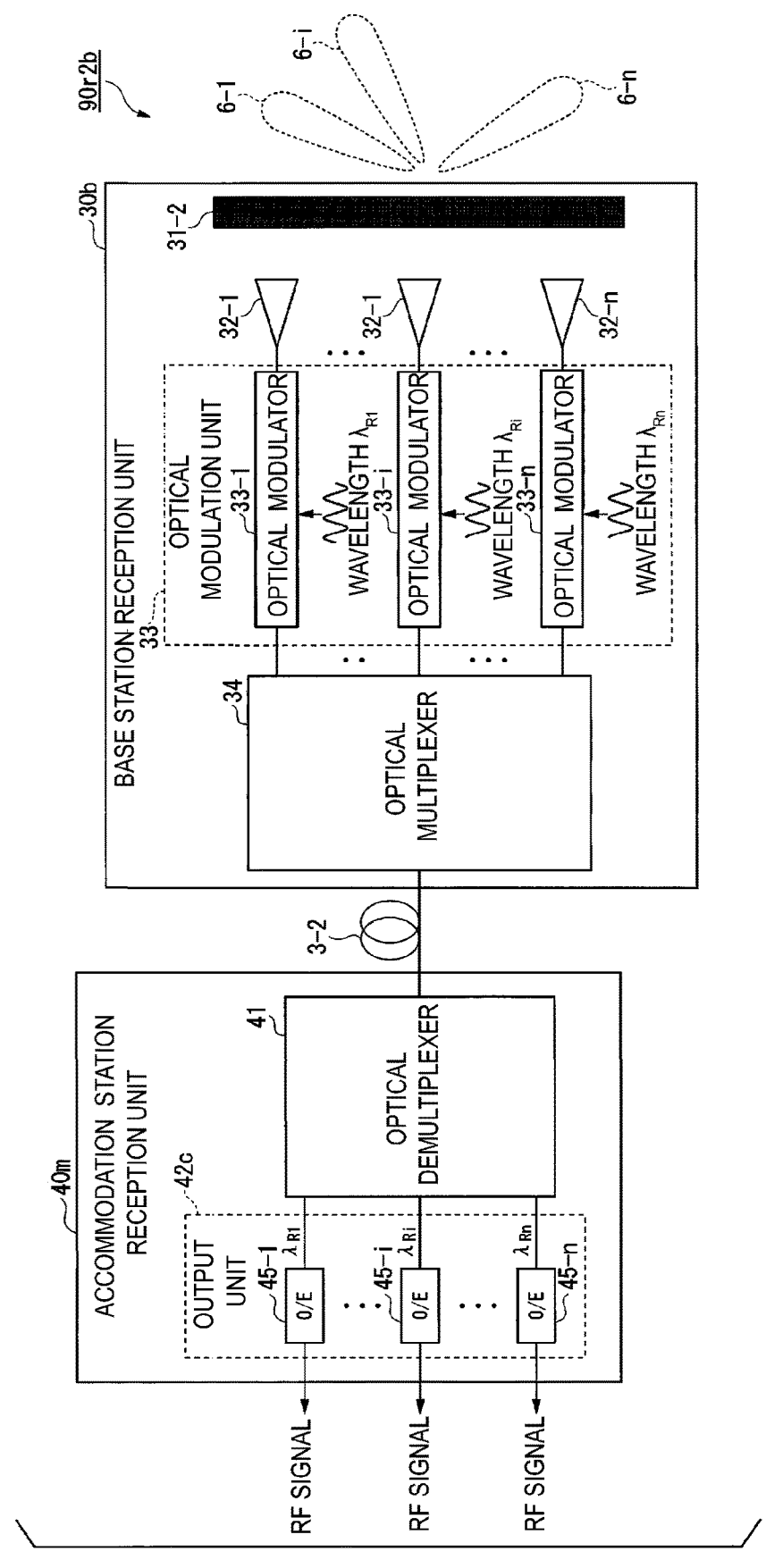
FIG. 20 is a block diagram illustrating another configuration example of the wireless reception system according to the fourth embodiment.

FIG. 20 is a block diagram illustrating a configuration of a wireless reception system 90$r$2$b$ that is another configuration example of the fourth embodiment. In FIG. 20, the same reference signs will be applied to the same configurations as those in FIGS. 13 and 18, and different configurations will be described below.

The wireless reception system 90$r$2$b$ includes an accommodation station reception unit 40$m$, a base station reception unit 30$b$, an upstream optical fiber 3-2, and a transmission terminal apparatus 9-2 that is illustrated FIG. 2, although not illustrated in FIG. 20. Here, it is assumed that n transmission terminal apparatuses 9-2 are present and are represented as transmission terminal apparatus 9-2-1 to 9-2-$n$.

In other words, the wireless reception system 90$r$2$b$ has a configuration in which the accommodation station reception unit 40$m$ of the wireless reception system 90$r$2$a$ according to the fourth embodiment and the base station reception unit 30$b$ of the wireless reception system 90$r$1$b$ that is another configuration example of the second embodiment are connected with the optical fiber 3-2.

Processing in Another Configuration Example of Fourth Embodiment

As processing performed by the wireless reception system 90$r$2$b$, the following processing is performed in Step Sd1 of the flowchart illustrated in FIG. 19. In other words, it is assumed that n reception beams 6-1 to 6-$n$ formed by each of the RF signals transmitted by the n transmission terminal apparatuses 9-2-1 to 9-2-$n$ have arrived. The n reception beams 6-1 to 6-$n$ pass through the transmit array 31-2, and the RF signals forming the reception beams 6-1 to 6-$n$ converge at the positions of the reception antennas 32-1 to 32-$n$ due to the aforementioned reversibility of the transmit array. Each of the reception antennas 32-1 to 32-$n$ receives the RF signal that has converged at each position and outputs the RF signal to the optical modulators 33-1 to 33-$n$ connected to each of the reception antennas 32-1 to 32-$n$. The same processing as that of the wireless reception system 90$r$2$a$ is performed in Steps Sd2 to Sd5.

In the wireless reception systems 90$r$2$a$ and 90$r$2$b$ according to the aforementioned fourth embodiment, the base station reception units 30$a$ and 30$b$ include a reflect array 31-1 or a transmit array 31-2, reception antennas 32-1 to 32-$n$, optical modulators 33-1 to 33-$n$, and an optical multiplexer 34. The reflect array 31-1 or the transmit array 31-2 receives the RF signal arriving from each of the directions of the reception beams 6-1 to 6-$n$ and converges the RF signal at a different convergence position in accordance with the arriving direction of the received RF signal. The reception antennas 32-1 to 32-$n$ are disposed at each of the convergence positions and receive the RF signals that have converged at the convergence positions. The optical modulators 33-1 to 33-$n$ are connected to the reception antennas 32-1 to 32-$n$, and light of different wavelengths $\lambda_{R1}$ to $\lambda_{Rn}$ is given to each of the optical modulators 33-1 to 33-$n$. Further, the optical modulators 33-1 to 33-$n$ modulate the given light to generate optical signals based on the RF signals received by the connected reception antennas 32-1 to 32-$n$. The optical multiplexer 34 multiplexes the optical signals of the mutually different wavelengths generated by the optical modulators 33-1 to 33-$n$ and outputs the multiplexed optical signal. The accommodation station reception unit 40$m$ includes an optical demultiplexer 41 and an output unit 42$c$, and the optical demultiplexer 41 obtains the optical signal output by the optical multiplexer 34 and demultiplexes the optical signal for each wavelength. The output unit 42$c$ includes O/E converters 45-1 to 45-$n$ connected to outputs of the optical demultiplexer 41, and each of the O/E converters 45-1 to 45-$n$ obtains the optical signals with mutually different wavelengths $\lambda_{R1}$ to $\lambda_{Rn}$ demultiplexed by the optical demultiplexer 41, converts the obtained optical signals into electrical signals to demodulate the RF signals, and output the demodulated RF signals.

In the aforementioned wireless reception systems 90$r$2$a$ and 90$r$2$b$, each of the n wavelengths $\lambda_{R1}$ to $\lambda_{Rn}$ and each of then reception antennas 32-1 to 32-$n$ are correlated by the optical multiplexer 34 and the optical demultiplexer 41 in a fixed manner. In other words, it is possible to state that each of the n wavelengths $\lambda_{R1}$ to $\lambda_{Rn}$ and each of the n reception beams 6-1 to 6-$n$ are correlated in a one-to-one relationship. Thus, the optical modulators 33-1 to 33-$n$ of the base station reception units 30$a$ and 30$b$ perform modulation with the RF signals output by the reception antennas 32-1 to 32-$n$ using the light of the n wavelengths $\lambda_{R1}$ to $\lambda_{Rn}$ as an optical carrier to generate n optical signals. It is possible to demodulate and output the RF signal by the optical multiplexer 34 multiplexing the n optical signals and transmitting the multiplexed optical signal to the accommodation station reception unit 40$m$ and by the accommodation station reception unit 40$m$ demultiplexing the optical signal for each wavelength and converting the demultiplexed optical signals into electrical signals. In this manner, the wireless reception systems 90$r$2$a$ and 90$r$2$b$ can form the multi beams, that is, the n reception beams 6-1 to 6-$n$ corresponding to each RF signal.

Note that in a case in which an RF signal has arrived from a direction other than the directions of the reception beams 6-1 to 6-$n$ in the aforementioned wireless reception systems 90$r$2$a$ and 90$r$2$b$, RF signals with different amplitudes and different phases as those of the original RF signal arrive at the positions of the plurality of reception antennas 32-1 to 32-$n$. Thus, each of the reception antennas 32-1 to 32-$n$ output RF signals with different amplitudes and different phases from those of the original RF signal.

In this case, the RF signals with different amplitudes and different phases are given to each of the optical modulators 33-1 to 33-$m$. Each of the optical modulators 33-1 to 33-$m$ generates the optical signals of the wavelengths $\lambda_{R1}$ to $\lambda_{Rn}$ modulated with the RF signals given to each of the optical modulators 33-1 to 33-$m$. From a different viewpoint, a state in which the RF signals are separately superimposed on the optical signals of the plurality of wavelengths $\lambda_{R1}$ to $\lambda_{Rn}$ is achieved. Thus, the output unit 42$c$ of the accommodation station reception unit 40$m$ is required to perform processing of demodulating the RF signals while targeting the plurality of optical signals output by the optical demultiplexer 41 from the plurality of output ports. For example, the output unit 42$c$ of the accommodation station reception unit 40$m$ performs electrical conversion on each of the optical signals demultiplexed and output by the optical demultiplexer 41 for each wavelength and demodulates the RF signal superimposed on each of the optical signals. The output unit 42$c$ may select and output the RF signal with the highest power from among the demodulated RF signals or may perform MIMO signal processing on the plurality of demodulated RF signals and output the result.

The aforementioned wireless reception systems 90$r$2$a$ and 90$r$2$b$ do not need any control of the base station apparatus 1 at all. Moreover, the information regarding the distance of the upstream optical fiber 3-2 is also not needed, and the number of wavelengths used is limited to the number of reception antennas 32-1 to 32-n. Further, a configuration for electrically changing switches is also not included. It is thus possible to perform beamforming for transmission/reception antennas without using control of the base station apparatus and information regarding the distance of the optical fiber while curbing degradation of wavelength utilization efficiency and an increase in cost.

Figure 21:
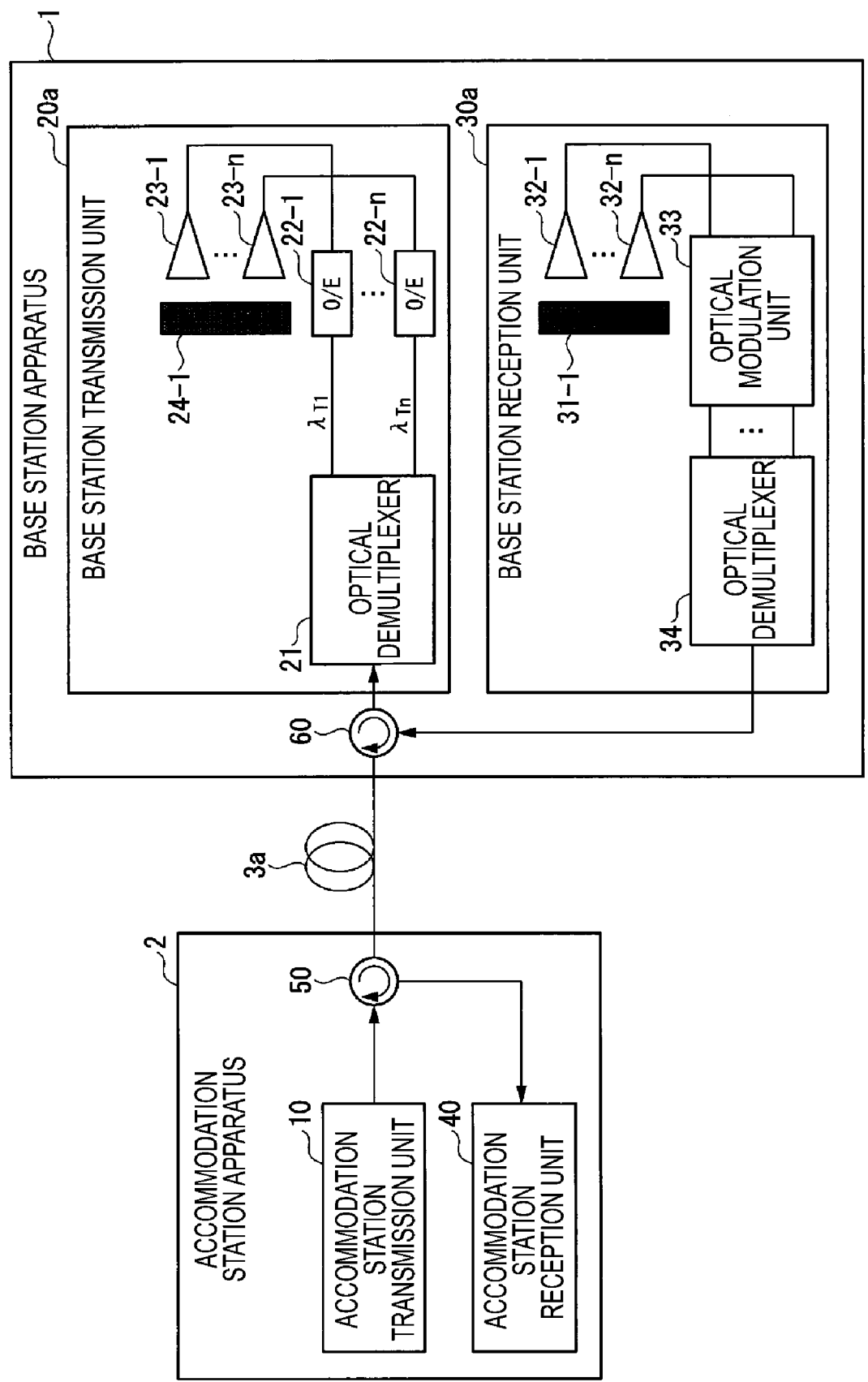
FIG. 21 is a diagram (No. 1) illustrating an example of a connection configuration between a base station apparatus and an accommodation station apparatus according to the first to fourth embodiments.

Connection Configuration between Accommodation Station Apparatus and Base Station Apparatus Although the optical fiber 3 is separately described as the downstream optical fiber 3-1 and the upstream optical fiber 3-2 on the assumption that the optical fiber 3 has two cores in the aforementioned first to fourth embodiments, a configuration may be employed in which circulators 50 and 60 as illustrated in FIG. 21 are used, for example. FIG. 21 is a block diagram illustrating a configuration in which the accommodation station apparatus 2 and the base station apparatus 1 are connected with a one-core optical fiber 3a. Note that as for the base station apparatus 1, the configuration in a case in which the base station transmission unit 20a including the reflect array 24-1 and the base station reception unit 30a including the reflect array 31-1 are included is illustrated.

The circulator 50 has three ports. The three ports that the circulator 50 has is a port connected to the accommodation station transmission unit 10, a port connected to the circulator 60 via the optical fiber 3a, and a port connected to the accommodation station reception unit 40. The circulator 50 obtains the optical signal output by the accommodation station transmission unit 10, outputs the optical signal to the optical fiber 3a, obtains the optical signal delivered through the optical fiber 3a, and outputs the optical signal to the accommodation station reception unit 40. The circulator 60, as with the circulator 50, has three ports. The three ports that the circulator 60 has is a port connected to the circulator 50 via the optical fiber 3a, a port connected to the base station transmission unit 20a, and a port connected to the base station reception unit 30a. The circulator 60 obtains the optical signal delivered through the optical fiber 3a, outputs the optical signal to the base station transmission unit 20a, obtains the optical signal output by the base station reception unit 30a, and outputs the optical signal to the optical fiber 3a.

Figure 22:
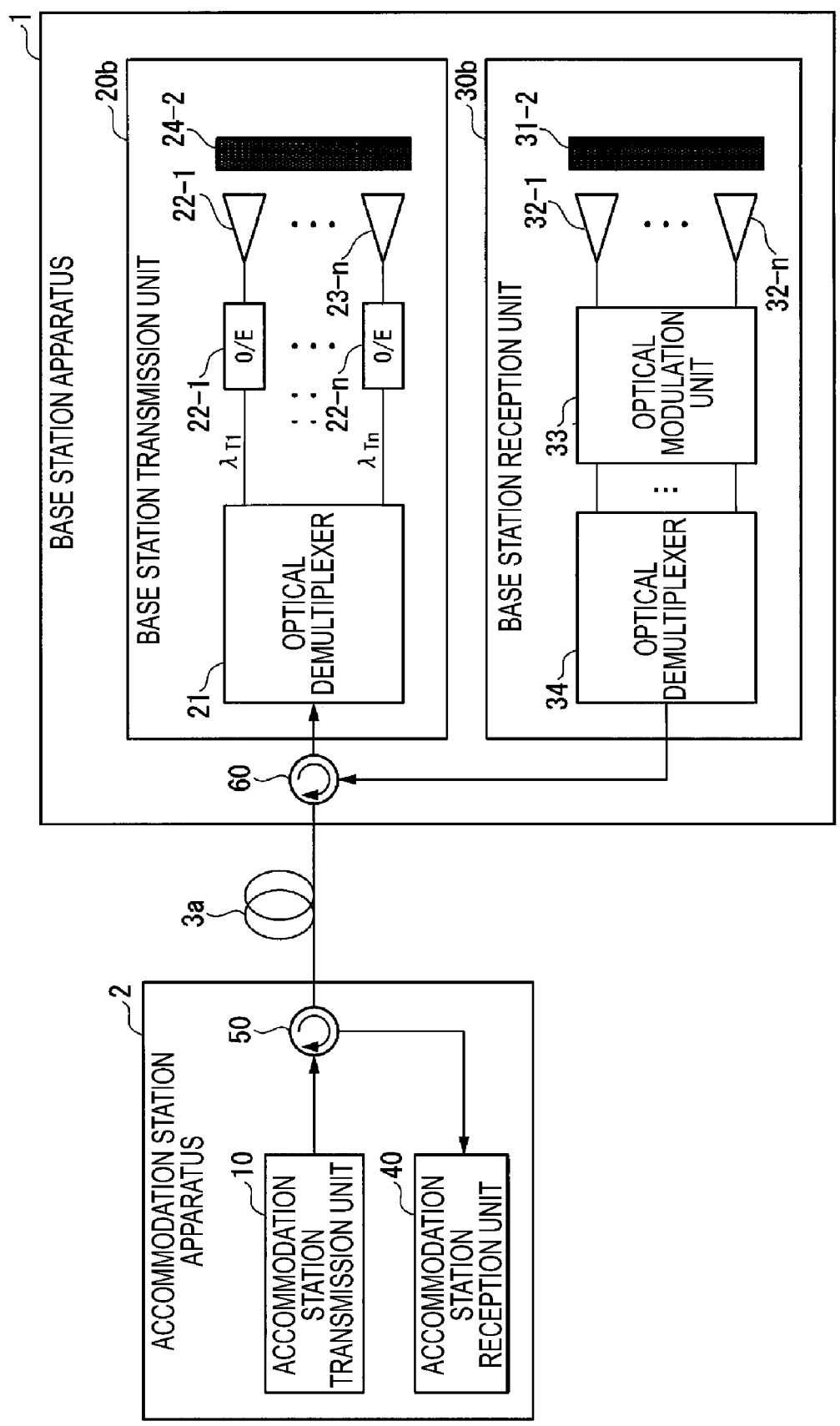
FIG. 22 is a diagram (No. 2) illustrating an example of a connection configuration between the base station apparatus and the accommodation station apparatus according to the first to fourth embodiments.
Figure 23:
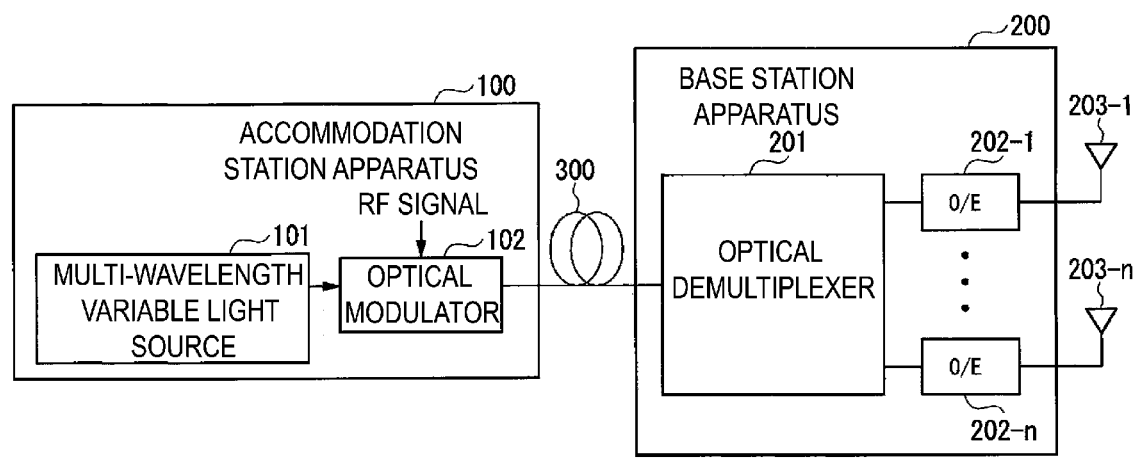
FIG. 23 is a block diagram illustrating a technique disclosed in PTL 1.
Figure 24:
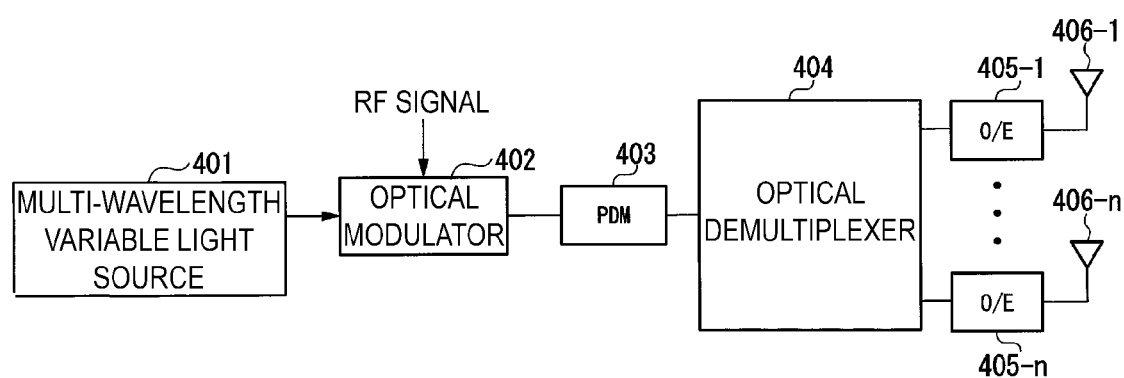
FIG. 24 is a block diagram (No. 1) illustrating a technique disclosed in NPL 1.
Figure 25:
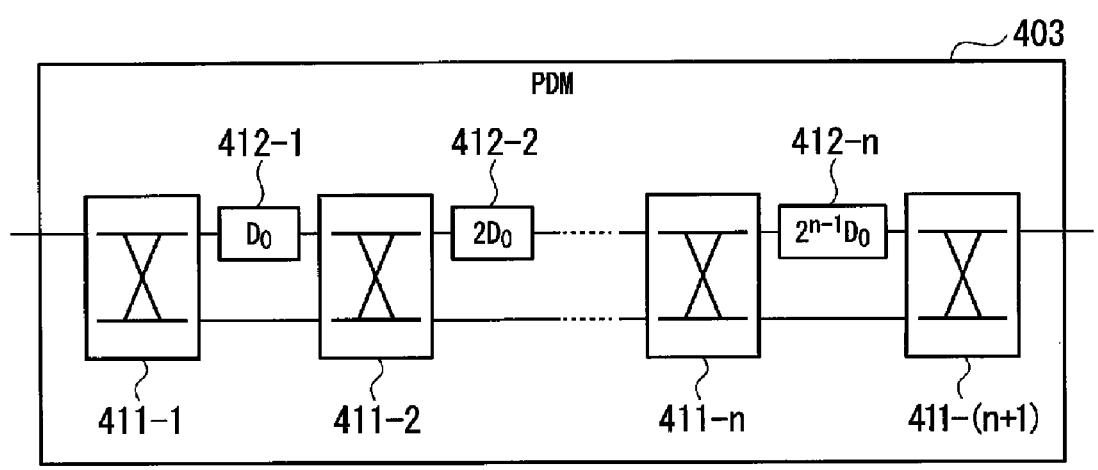
FIG. 25 is a block diagram (No. 2) illustrating a technique disclosed in NPL 1.

Further, the base station apparatus 1 may include a base station transmission unit 20b including the transmit array 24-2 and a base station reception unit 30b including the transmit array 31-2, and a configuration in that case is the configuration illustrated in FIG. 22.

Note that in the case of the single mode, the accommodation station transmission unit 10s is applied to the accommodation station transmission unit 10, and the accommodation station reception unit 40s is applied to the accommodation station reception unit 40 in FIGS. 21 and 22. In the case of the multi mode, the accommodation station transmission unit 10m is applied to the accommodation station transmission unit 10, and the accommodation station reception unit 40m is applied to the accommodation station reception unit 40.

Although the wavelengths $\lambda_{T1}$ to $\lambda_{Tn}$ of the light delivered through the downstream optical fiber 3-1 may be the same as the wavelengths $\lambda_{R1}$ to $\lambda_{Rn}$ of the light delivered by through the upstream optical fiber 3-2 in the aforementioned first to fourth embodiments, the optical fiber 3a in the case of the configuration in FIGS. 21 and 22 has one core, and it is thus necessary for the wavelengths $\lambda_{T1}$ to $\lambda_{Tn}$ to be different from the wavelengths $\lambda_{R1}$ to $\lambda_{Rn}$.

The transmission wavelength control units 12a and 12b and the reception wavelength control unit 43 in the aforementioned embodiments may be realized by a computer. In that case, the functions may be realized by recording a program for realizing the functions in a computer readable recording medium and causing a computer system to read and execute the program recorded in the recording medium. Note that the "computer system" described here is assumed to include an OS and hardware such as a peripheral device. Further, the "computer-readable recording medium" means a portable medium such as a flexible disk, a magneto-optical disk, a ROM, or a CD-ROM or a storage device such as a hard disk incorporated in the computer system. Moreover, the "computer-readable recording medium" may include a recording medium that dynamically holds the program for a short period of time, such as a communication line in a case in which the program is transmitted via a network such as the Internet or a communication line such as a telephone line, or a recording medium that holds the program for a specific period of time, such as a volatile memory inside a computer system that serves as a server or a client in that case. Further, the aforementioned program may be for realizing some of the aforementioned functions, may be able to realize the aforementioned functions in combination with a program that has already been recorded in the computer system, or may be realized using a programmable logic device such as a field programmable gate array (FPGA).

Although the embodiment of the present invention has been described in detail with reference to the drawings, a specific configuration is not limited to the embodiment, and a design or the like in a range that does not depart from the gist of the present invention is included.

INDUSTRIAL APPLICABILITY

The present invention is applicable in a case in which beamforming is performed in a wireless communication system using an RoF.

REFERENCE SIGNS LIST

90 Wireless communication system
1 Base station apparatus
2 Accommodation station apparatus
3 Optical fiber
9 Terminal apparatus
10 Accommodation station transmission unit
20 Base station transmission unit
30 Base station reception unit
40 Accommodation station reception unit

The invention claimed is:
1. A wireless reception system, comprising:
a base station reception unit; and
an accommodation station reception unit, wherein
the base station reception unit includes:
a reception beam formation unit including a reflect array or a transmit array, the reflect array or the transmit array being configured to receive a plurality of RF signals and converge the plurality of RF signals at a plurality of convergence positions that differ depending on arriving directions of the plurality of RF signals to form a plurality of reception beams;
a plurality of reception antennas disposed at each of the plurality of convergence positions and configured to receive the plurality of RF signals that have converged at the plurality of convergence positions;

a plurality of optical modulators connected to the plurality of reception antennas, the plurality of optical modulators being configured to obtain light of different wavelengths and modulate the obtained light to generate a plurality of optical signals based on the plurality of RF signals received by the plurality of connected reception antennas, and an optical multiplexer configured to multiplex the plurality of optical signals of different wavelengths generated by the plurality of optical modulators and output the plurality of multiplexed optical signals; and the accommodation station reception unit is configured to obtain the plurality of optical signals output by the base station reception unit, and includes:

an optical demultiplexer configured to obtain the plurality of optical signals output by the optical multiplexer of the base station reception unit and demultiplex the plurality of optical signals for each wavelength, and an output unit configured to convert the plurality of optical signals demultiplexed by the optical demultiplexer into a plurality of electrical signals to demodulate the plurality of RF signals and output the plurality of demodulated RF signals.

2. The wireless reception system according to claim 1, wherein the output unit includes a plurality of photoelectric converters, the plurality of photoelectric converters convert, into an electrical signal, the optical signal of any one of the wavelengths included in the plurality of optical signals output by the optical demultiplexer.

3. The wireless reception system according to claim 1, wherein the output unit includes a plurality of photoelectric converters, where each of the plurality of photoelectric converters is connected to an output of the optical demultiplexer, each of the plurality of photoelectric converters obtains the optical signals of the mutually different wavelengths demultiplexed by the optical demultiplexer, converts the obtained optical signals into electrical signals to demodulate the plurality of RF signals, and outputs the plurality of demodulated RF signals.

4. A wireless transmission method performed by a wireless transmission system including a base station reception unit and an accommodation station reception unit, the method comprising:

receiving, by a reflect array or a transmit array of the base station reception unit, a plurality of RF signals and converging the plurality of RF signals at a plurality of convergence positions that differ depending on arriving directions of the plurality of RF signals to form a plurality of reception beams;

receiving, by a plurality of reception antennas disposed at each of the plurality of convergence positions, the plurality of RF signals that have converged at the plurality of convergence positions;

obtaining, by a plurality of optical modulators connected to the plurality of reception antennas, light of different wavelengths and modulating the obtained light to generate a plurality of optical signals based on the plurality of RF signals received by the plurality of connected reception antennas;

multiplexing, by an optical multiplexer of the base station reception unit, the plurality of optical signals of different wavelengths generated by the plurality of optical modulators and output the plurality of multiplexed optical signals;

obtaining, by the accommodation station reception unit, the plurality of optical signals output by the base station reception unit;

demultiplexing, by an optical demultiplexer of the accommodation station reception unit, the plurality of optical signals for each wavelength; and converting, by an output unit of the accommodation station reception unit, the plurality of optical signals demultiplexed by the optical demultiplexer into a plurality of electrical signals to demodulate the plurality of RF signals and outputting the plurality of demodulated RF signals.

\* \* \* \* \*